United States Patent
Mysur et al.

(10) Patent No.: US 9,892,121 B2
(45) Date of Patent: Feb. 13, 2018

(54) METHODS AND SYSTEMS TO IDENTIFY AND USE EVENT PATTERNS OF APPLICATION WORKFLOWS FOR DATA MANAGEMENT

(71) Applicant: HITACHI, LTD., Tokyo (JP)

(72) Inventors: Kaushik Triyambaka Mysur, Singapore (SG); Hirokazu Ikeda, Singapore (SG)

(73) Assignee: Hitachi, Ltd., Tokyo (JP)

( * ) Notice: Subject to any disclaimer, the term of this patent is extended or adjusted under 35 U.S.C. 154(b) by 839 days.

(21) Appl. No.: 14/331,464

(22) Filed: Jul. 15, 2014

(65) Prior Publication Data

US 2016/0019206 A1    Jan. 21, 2016

(51) Int. Cl.
G06F 17/30 (2006.01)
G06Q 10/06 (2012.01)

(52) U.S. Cl.
CPC ......... *G06F 17/3007* (2013.01); *G06Q 10/06* (2013.01)

(58) Field of Classification Search
None
See application file for complete search history.

(56) References Cited

U.S. PATENT DOCUMENTS

| | | | |
|---|---|---|---|
| 7,730,275 B2 | 6/2010 | Furuhashi et al. | |
| 8,402,238 B2 | 3/2013 | Saito et al. | |
| 2003/0163449 A1* | 8/2003 | Iwano | G06F 3/0601 707/1 |
| 2010/0299306 A1* | 11/2010 | Agetsuma | G06F 17/30144 707/609 |
| 2012/0278513 A1* | 11/2012 | Prevost | H04L 67/32 710/39 |
| 2013/0179381 A1* | 7/2013 | Kawabata | G06F 17/30144 706/46 |

* cited by examiner

*Primary Examiner* — James Trujillo
*Assistant Examiner* — Cheryl M Shechtman
(74) *Attorney, Agent, or Firm* — Mattingly & Malur, PC

(57) ABSTRACT

An application-aware, automated and proactive approach to event-based data analysis and management of data is disclosed. Events are operations directed at stored file content as specified by applications. The tracking of the events allows for the file types of the file content associated with the events to be determined for individual applications as event patterns which are managed as templates. For a set of events that match one of the templates, the appropriate timing to perform data management can be determined according to the event pattern and file types thereof as specified by the template. Further, plural templates can be correlated to define a workflow of plural applications by the event patterns thereof. Workflows are used to predict whether all applications have completed accessing the files associated therewith. Data management can then be executed on the files of the completed workflow.

14 Claims, 31 Drawing Sheets

| Event ID | File name (full path) | Application-ID | | | Event | Time of Event |
|---|---|---|---|---|---|---|
| | | NFS Client IP address | NFS Client ID | NFS open_owner4 (Process ID / Thread ID) | | |
| E1 | /x/y.bcl | a.b.c.d | 1234 | 0x41E02940 | CLOSE | T1 |
| E2 | /z/y.SAM | ... | ... | ... | CREATE | T2 |
| ... | ... | ... | ... | ... | ... | ... |

Figure 5

APP-Template-ID

| Event # | File type | Event Details |
|---|---|---|
| 1 | .FASTQ | OPEN |
| 2 | .cfg | OPEN |
| 3 | .cfg | READ |
| 4 | - | LOOP |
| 4.1 | .temp | CREATE |
| 5 | .SAM | CREATE |
| 6 | - | LOOP |
| 6.1 | .FASTQ | READ |
| 6.2 | .SAM | WRITE |
| 7 | .FASTQ | CLOSE |
| 8 | .BAM | CREATE |
| 9 | .BAM | WRITE |
| 10 | .SAM | CLOSE |
| 11 | .BAM | CLOSE |
| 12 | - | LOOP |
| 12.1 | .temp | REMOVE |

Figure 9

| File type | Action1 | Action2 | Action3 | ... |
|---|---|---|---|---|
| FASTQ | Compress | Migrate (+1day) | Archive (+30day) | ... |
| BCL | Archive | - | - | ... |
| SAM | Archive | Delete (+30 day) | - | ... |
| BAM | Compress | Migrate (+15 day) | - | ... |

Figure 15

| Context # | File name | Action |
|---|---|---|
| C1 | /x/y.FASTQ | Migrate (+1day) |
| C2 | /x/y.FASTQ | Archive (+30day) |
| C3 | /x/y.SAM | Delete (+30 day) |
| C4 | /x/y.BAM | Migrate (+15 day) |
| ... | ... | ... |

Figure 16

METHODS AND SYSTEMS TO IDENTIFY AND USE EVENT PATTERNS OF APPLICATION WORKFLOWS FOR DATA MANAGEMENT

TECHNICAL FIELD

The present invention relates generally to data analysis and management. Particularly, the present invention relates to application-aware data analysis and proactive data management.

BACKGROUND

In general, the amount of data generated from various industries has been increasing rapidly leading to the need for intelligent, proactive and accurate data management. For example, in the science and engineering disciplines, the volume of generated data has been increasing at a massive rate. Petabytes scale data centers, for example, are generally used for storing and managing data from various scientific and engineering simulations. In accordance with the technical progression in the scientific and engineering fields, the speed at which data is generated and the number of data types thereof to be managed have been increasing. Accordingly, data storage and management is integral to the operation of such data centers. However, significant planning and estimation to predict the storage requirements of such data centers is required. Further, as more and more data is generated over time, such data centers end up with islands of storage with different technologies and different vendors. This causes the administrative costs to maintain such data centers to exponentially increase over time and these administrative costs can be a significant contribution to the total cost of ownership (TCO) in the case of Petabyte scale data centers. Hence, there is a need for an easy-to-use and flexible data management technology to help manage the massive amounts of data which require storage and to reduce the TCO. Further, there is a need to provide a completely automated and intelligent data management technology.

As one particular example of data management, at data centers which store genomes and genetic information as data, with the advent of next-generation genetic sequencers, the data generated per sequencer has exponentially increased and in excess of 25 TB of data may be generated on a daily basis. In addition, the cost of sequencing has drastically reduced, in turn, leading to greater and greater data generation per data center as more and more genetic sequencers are brought into operation. A primary goal of genome applications is to analyze the massive amounts of data generated by the sequencers, generate analysis results which are used for downstream analysis to study the significance of genomics and other life sciences data. Whereas, in the case of engineering applications, downstream analysis typically includes building simulation models from upstream analysis results. A key challenge in genome data centers is to manage the processed data while also managing the large amounts of new data from the sequencers. In view of the foregoing problem, there is a need for pro-active data management technology which can proactively predict the usage of data and migrate lower priority, processed data to cheaper storage while keeping primary storage capacity available for newly generated sequencer data. As another example, oil and gas exploration similarly involve applications which generate large amounts of data from seismic studies which require data management and can be subjected to unpredictable work loads. In the case of oil and gas data, volumes of up to 50 TB may generated on a weekly basis.

Several data management technologies and solutions have been proposed in the prior art to reduce administrative costs and help manage the massive amounts of data which require storage. In a heat map-based approach, cold data pages are migrated to cheaper storage tiers and hot data pages are migrated to a high performance primary storage tier. The number of read/write operations per second is used as a reference to classify data pages as hot or cold. The migration is made transparent to applications by using a page mapping table to map logical pages to physical pages where data currently resides. The decision to migrate or not is further dependent on a threshold set for the primary storage. Cold data is not migrated, for example, to a secondary storage tier if there is enough capacity left in primary storage tier. If there is a surge of new data which needs to be stored on the primary storage tier, providing such storage could become a bottleneck. Thus, a heat map-based approach does not provide proactive data management. Further, a problem exists in the heat map-based approach where no data management occurs until additional primary storage capacity is needed which can delay access speeds due to the additional processing load caused by migration. In addition, difficulties are present in managing the impact that new applications and updates to existing applications will cause when serving the existing data from storage.

In another approach, an attempt to provide proactive data management using pre-defined performance and availability requirements is made based on temporal characteristics for different data types. However, such a solution requires that the requirements for each data type be manually predefined. As such, the foregoing management solution fails to provide fully automated data management. In addition, the use of temporal characteristics can result in the erroneous data management as the application types which access data is not considered.

Further, an approach to data management where data usage behavior is learned and a knowledge base is created as a reference to manage other data with similar characteristics has been provided. In this approach, every data object is assigned a management class using assignment logic. Assignment logic uses predefined rules and logic to search the knowledge database to find similar data object. This similarity search uses static attributes like data object type, node where it was created and the size of the data object. If a match is found, the matched data object's usage history like creation time, last used, when compressed, when downloaded, which application created it and so on. This usage history is used to assign a management class for the new data object. If a match is not found in the database, this data object is added into the database and its usage is tracked for future management class assignment. This approach uses temporal analysis to learn data management needs and apply them to similar data object types. However, under varying workloads, it cannot accurately determine when to apply data management processing. For instance, if a data object A of type X was processed by an application and later compressed at a specific date, another data object B of type X will also be expected to be compressed after the same time interval due to the temporal nature of the analysis. However, if the data object B is processed under a different system load, the compression may happen sooner or later than estimated by this approach. Hence, temporal analysis is not accurate to determine when a data management action has to be taken. Thus, the temporal analysis approach lacks accuracy.

BRIEF SUMMARY OF THE INVENTION

In view of the problems inherent in the foregoing, there exists a need for fine grained, application and/or workflow aware data management. In the case of genome analysis, the analysis is divided into 3 stages. Primary analysis mainly involves Image analysis, Base calling and converting sequencer specific data (e.g., BLC file types) into industry standard files (e.g., FASTQ file types). The secondary analysis includes de-multiplexing, de-novo assembly, mapping (e.g., reading a FASTQ file type and generating SAM and BAM file types) and Variant analysis. The tertiary analysis includes reporting, visualization and other downstream analysis. Each of the foregoing file types may have different uses according to the different applications but generally all share the same file system namespace. Thus, there is a need for data management on a file-type basis as specified by different management policies. To further complicate the foregoing management problem, hundreds of different genome applications exist, which each require frequent software updates, and new applications are also being placed into operation. For example, each application may use stored data in a different way such accessing different file types, accessing file types at different times as well as accessing several file types over time. Hence, there is a need for data management which can understand and recognize the various applications and chains of applications which create a "workflow", and then apply data management actions. Data management actions may include processes like migration, transparent compression, archival and other data retention operations.

In view of the foregoing problems associated with data management, a need exists for data management which can provide fully automated, proactive, fine-grained, application aware data management. Accordingly, the present invention is directed to providing systems, apparatuses and methods to identify and manage event patterns of applications in order to more accurately and efficiently provide data management for stored data. Event patterns are identified and managed to create application templates to characterize the types of files and types of actions individual client applications perform on stored data in correlation. In addition, the event patterns and application templates can be identified and managed to create workflow templates to characterize the types of files, types of actions, and types of applications in correlation.

The creation of such templates can be considered to be a learning phase or process where a knowledge base is generated to describe the access patterns between client applications and stored file contents. Further, the templates can be leveraged for data management in a knowledge applying phase or process where existing templates are matched against temporary templates of recent client application access to determine when the appropriate time is to execute specific data management actions.

In one aspect of the present invention, a server which processes operations from a client has an application template generation section and a data management section. Operations requested by the client are monitored as events. The events are analyzed and organized according with respect to specific applications and files. Further, application templates are generated according to file type and event details. Applications are managed in correspondence with the file types that are respectively accessed by the applications. When a set of one or more recent events match an existing application template of past events, data management can be initiated on the files which are previously known to correspond to the set of events based on the matching application template. One or more data management actions can then be executed according to a storage policy or a management policy as specified by the file types of the matching application template. Thus, by monitoring the events to generate a knowledge base, appropriate data management actions can be automatically determined in a proactive manner in an application-specific manner.

In another aspect of the present invention, a server which processes operations from a client has an application template generation section and a data management section. Operations requested by the client are monitored as events. The events are analyzed and organized according with respect to specific applications and files. Further, application templates are generated according to file type and event details. The application templates are correlated based on respective file type access. Correlated application templates are managed together as workflow templates. When a set of one or more events match an existing application template, then a set of files belonging to a corresponding workflow template of the matching application template can be identified. According to the workflow template it can be determined whether all applications have completed accessing the set of files and data management can be initiated thereon. One or more data management actions can then be executed according to a storage policy or a management policy as specified by the file types of the matching application template. Thus, by monitoring the events to generate a knowledge base, appropriate data management actions can be automatically determined in a proactive manner in an application-specific manner which further considers the interrelated patterns of access between one or more applications on one or more file types.

In yet another aspect of the present invention, the aforementioned server can be modified so that separate physical or logical devices are provided to store file metadata and file contents separately. When separate physical or logical devices are provided to store the file metadata and file contents separately, data management can be provided based on client requests for operations relating to the metadata, or alternatively to both the metadata and the file content. By providing different server configurations, the distribution of the file serving, event analysis and data management can be efficiently distributed over plural devices.

The foregoing has outlined some of the more pertinent features of the invention. These features should be construed to be merely illustrative. Many other beneficial results can be attained by applying the disclosed invention in a different manner or by modifying the invention as will be described.

BRIEF DESCRIPTION OF THE DRAWINGS

FIG. 5 illustrates an exemplary global event history table according to the first embodiment of the present invention;

FIG. 9 illustrates an exemplary application template according to the first embodiment of the present invention;

FIG. 15 illustrates an exemplary per-file-type data management table according to the first embodiment of the present invention;

FIG. 16 illustrates an exemplary pending data management table according to the first embodiment of the present invention;

DETAILED DESCRIPTION OF THE INVENTION

Figure 1:
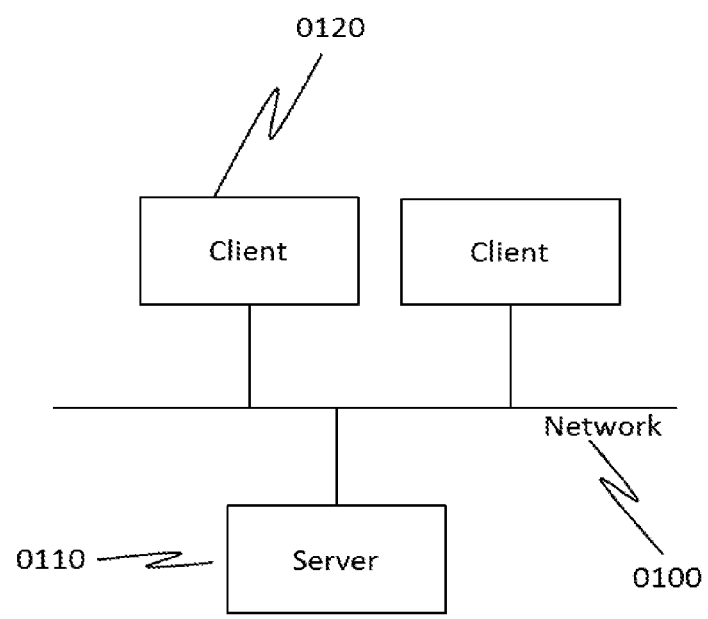
FIG. 1 illustrates an exemplary network configuration in which the methods and systems according to a first embodiment of the present invention may be applied.

In the following detailed description of the invention, reference is made to the accompanying drawings which form a part of the disclosure, and in which are shown by way of illustration, and not of limitation, exemplary embodiments by which the invention may be practiced. In the drawings, like numerals describe substantially similar components throughout. Further, it should be noted that while the detailed description provides various exemplary embodiments, as described below and as illustrated in the drawings, the present invention is not limited to the embodiments described and illustrated herein, but can extend to other embodiments, as would be known or as would become known to those skilled in the art. Reference in the specification to "one embodiment" or "this embodiment" means that a particular feature, structure, or characteristic described in connection with the embodiment is included in at least one embodiment of the invention, and the appearances of these phrases in various places in the specification are not necessarily all referring to the same embodiment. Additionally, in the following detailed description, numerous specific details are set forth in order to provide a thorough understanding of the present invention. However, it will be apparent to one of ordinary skill in the art that these specific details may not all be needed to practice the present invention. In other circumstances, well-known structures, materials, circuits, processes and interfaces have not been described in detail, and/or may be illustrated in block diagram form, so as to not unnecessarily obscure the present invention.

Moreover, some portions of the detailed description that follow are presented in terms of flow diagrams of processes, algorithms and symbolic representations of operations within a computer. These flow diagrams of processes, algorithmic descriptions and symbolic representations are the means used by those skilled in the data processing arts to most effectively convey the essence of their innovations to others skilled in the art. In the present invention, the steps carried out require physical manipulations of tangible quantities for achieving a tangible result. Usually, though not necessarily, these quantities take the form of electrical or magnetic signals or instructions capable of being stored, transferred, combined, compared, and otherwise manipulated. It has proven convenient at times, principally for reasons of common usage, to refer to these signals as bits, values, elements, symbols, characters, terms, numbers, instructions, or the like. It should be borne in mind, however, that all of these and similar terms are to be associated with the appropriate physical quantities and are merely convenient labels applied to these quantities. Unless specifically stated otherwise, as apparent from the following discussion, it is understood that throughout the description, discussions utilizing terms such as "processing", "computing", "calculating", "checking", "determining", "displaying", "extracting" or the like, can include the actions and processes of a computer system or other information processing device that manipulates and transforms data represented as physical quantities (electronic quantities within the computer system's registers and memories) into other data similarly represented as physical quantities within the computer system's memories or registers or other information storage, transmission or display devices.

The present invention also relates to apparatuses or systems for performing the operations herein. These may be specially constructed for the required purposes, or it may include one or more general-purpose computers or Servers selectively activated or reconfigured by one or more computer readable media. Such computer-readable storage media have computer executable instructions such as modules stored thereon and generally include, but are not limited to, optical disks, magnetic disks, read-only memories, random access memories, solid state devices and drives, or any other type of media suitable for storing electronic information. The processes, algorithms and displays presented herein are not inherently related to any particular computer or other apparatus. Various general-purpose systems may be used in accordance with the teachings herein, or it may prove convenient to construct a more specialized apparatus to perform desired processes and methods. The structure for a variety of these systems will appear from the description set forth below. In addition, the present invention is not described with reference to any particular programming language. It will be appreciated that a variety of programming languages may be used to implement the teachings of the invention as described herein. The instructions of the programming language(s) may be executed by one or more processing devices, e.g., central processing units (CPUs), processors, or controllers. While the following description refers to use NFSv4.1 as a baseline network file system which provides file system services over a network to store and retrieve data or files from a storage device, the scope of the present invention is not limited in this regard.

Exemplary embodiments of the invention, as will be described in greater detail below, provide apparatuses, methods and computer modules for identifying and managing event patterns of application workflows so that data management of data accessed by the application workflows can be efficiently managed. According to one exemplary embodiment, a server which processes operations from a client has an application template generation section and a data management section. Operations requested by the client are monitored as events. The events are analyzed and organized according with respect to specific applications and files. Further, application templates are generated according to file type and event details. Applications are managed in correspondence with the file types that are respectively accessed by the applications. When a set of one or more events match an existing application template, data management can be initiated on the files which are previously known to correspond to the set of events based on the matching application template. One or more data management actions can then be executed according to a storage policy or a management policy as specified by the file types of the matching application template.

In another exemplary embodiment, a server which processes operations from a client has an application template generation section and a data management section. Operations requested by the client are monitored as events. The events are analyzed and organized according with respect to specific applications and files. Further, application templates are generated according to file type and event details. The application templates are correlated based on respective file type access. Correlated application templates are managed together as workflow templates. When a set of one or more events match an existing application template, then a set of files belonging to a corresponding workflow template of the matching application template can be identified. According to the workflow template it can be determined whether all applications have completed accessing the set of files and data management can be initiated thereon. One or more data management actions can then be executed according to a storage policy or a management policy as specified by the file types of the matching application template.

In further embodiments, the server can be modified so that separate physical or logical devices are provided to store file metadata and file contents separately. When separate physical or logical devices are provided to store the file metadata and file contents separately, data management can be provided based on client requests for operations relating to the metadata, or alternatively to both the metadata and the file content.

First Embodiment

FIG. 1 shows exemplary network architecture according to the first embodiment of the present invention. The system consists of a Server 0110 and a plurality of Clients 0120 connected to a network 0100. The network, for example, may be a local area network (LAN).

The Server 0110 is a device which provides file system services over a network 0100. The Server 0110 manages a namespace of the file system, stores metadata of the files and directories, and stores data or file contents. The Server 0110 provides service to metadata operations initiated by Clients 0120. The Server 0110 maps the namespace of the file system to the actual file contents. In addition, the Server 0110 also processes Read and Write requests from Clients 0120 to retrieve or store file contents.

The Clients 0120 are devices (such as PCs or other application Servers) which have a network file system protocol program for communicating with the Server 0110. Clients 0120 communicate with Server 0110 to access and modify file system namespace, and read and write file contents.

Figure 2:
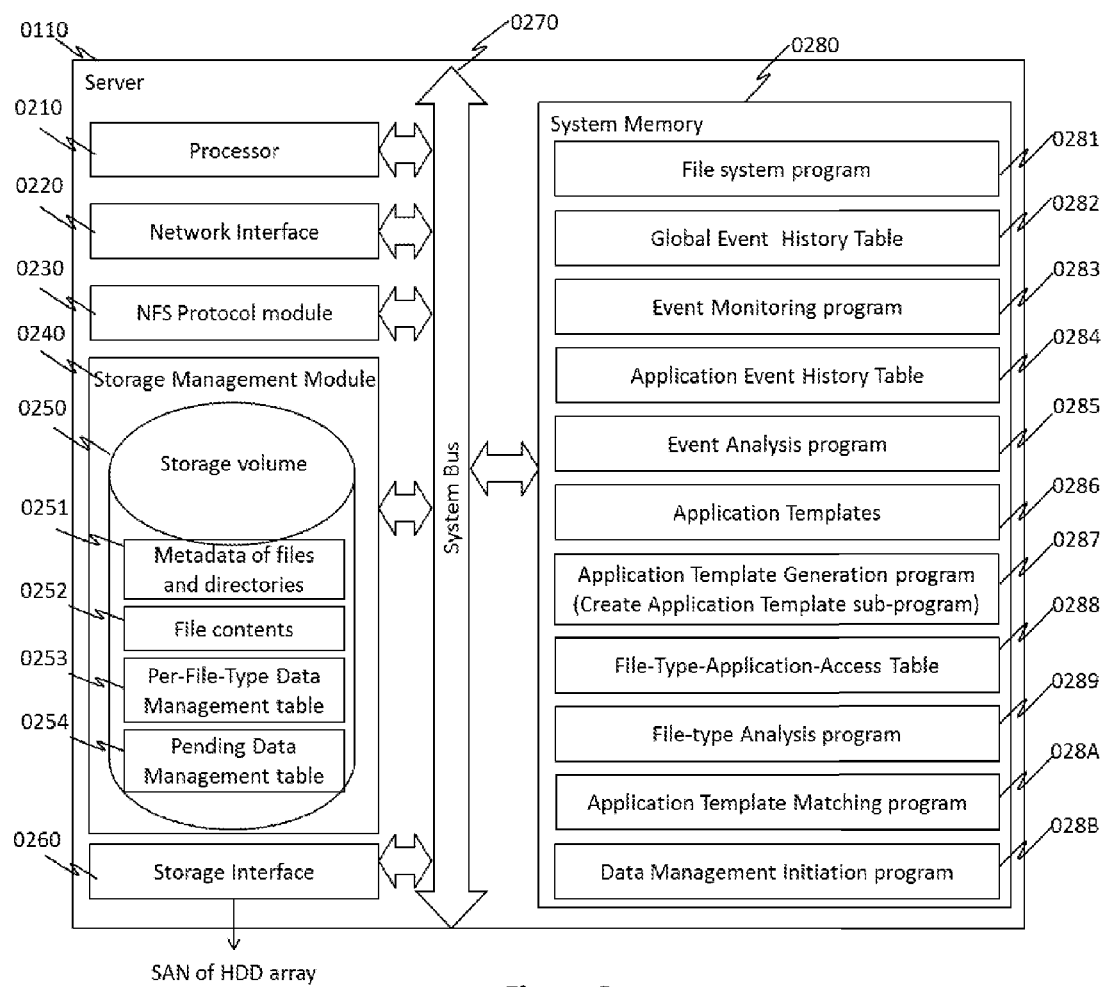
FIG. 2 is a block diagram of an exemplary Server which provides storage management as shown in FIG. 1 according to the first embodiment of the present invention.

FIG. 2 is a block diagram of an exemplary server as a data management system which provides storage management as shown in FIG. 1 according to the first embodiment of the present invention. As shown in FIG. 1, the Server 0110 may include, but is not limited to, a processor 0210, a network interface 0220, an NFS (Network File System like NFSV4.1 or above) protocol program 0230, a storage management program 0240, a storage volume 0250, a storage interface 0260, a system bus 0270, and a system memory 0280 as components thereof. The system memory 0280 may include, but is not limited to, a file system program 0281, a Global Event History Table 0282 (GENT), an Event Monitoring program 0283, an Application Event History Table 0284 (AEHT), an Event Analysis program 0285, Application Templates 0286, an Application Template Generation program 0287, a File-Type-Application-Access Table 0288 (FTAAT), a File-type Analysis program 0289, an Application Template Matching program 028A, and a Data Management Initiation program 028B. It is noted that the Server 0110 may be modified to include multiple instances of the components shown in FIG. 2 if desired.

The processor 0210 represents a central processing unit that executes the programs stored in the system memory 0280. The server 0110 may be provided with one or more processors 0210. Thus, while the following description and Figs. refer to the programs stored in the system memory 0280, it is understood that the programs stored in the system memory cause the processor 0210 to carry out, or execute, the process flows as shown and described herein. Namely, the system memory stores instructions which when executed by the processor 0210 cause the processor to perform the acts or actions shown and described in the process flows of each of the programs shown in the system memory and manage the tables shown therein as well. For example, the NFS protocol program 0230 is responsible for Server functionality of the NFS protocol such as NFSV4.1 or above, for example. As a NFS Server, it provides service to all NFS operations initiated from the Clients 0120. The network interface 0220 connects the Server 0110 to the network 0100 for communication with Clients 0120 via the respective network interface 0330. On the Server 0110, the GEHT 0282, AEHT 0284, application templates 0286 and the FTAAT 0288 are read and written to by the programs in system memory 0280. The storage interface 0260 connects the storage management program 0240 to one or more storage devices over storage area network (SAN) or to at least one storage device (e.g., internal hard disk drives or HDDs) for raw data storage of file data. Thus, the storage devices may be internal or external storage devices provided to the Server 0110, and in the alternative, the Server 0110 may be provided with a combination of both internal and external storage. The storage management program 0240 organizes raw data onto a storage volume 0250 which also contains metadata of files and directories 0251, file contents 0252, Per-File-Type Data Management Table 0253 (PFTDMT), and Pending Data Management Table 0254 (PDMT). The metadata of files and directories 0251 and file contents 0252 are read and written to by the file system program 0281. The PFTDMT 0253 is pre-defined manually and stored in the storage volume 0250 and is read by the programs in system memory 0280. The PDMT 0254 is created, updated and read by the Data Management Initiation program 028B and stored in the storage volume 0250. As shown in FIG. 2, commands and data are communicated between the processor 0210 and other components of the Server 0110 over a system bus 0270.

Figure 3:
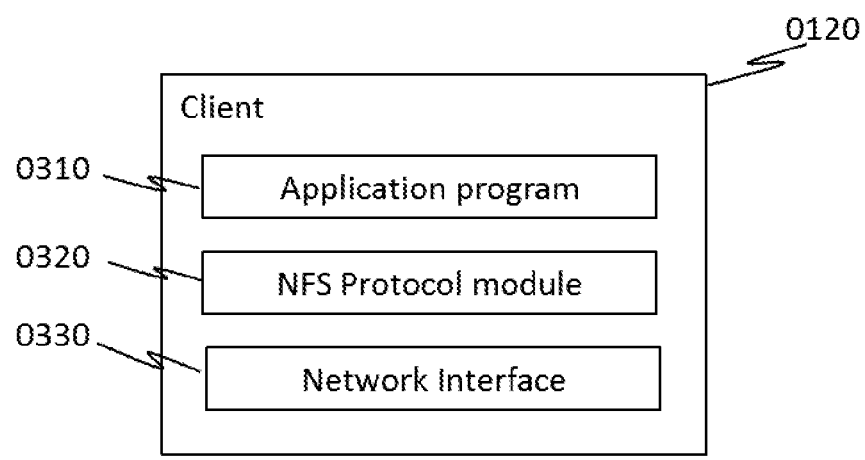
FIG. 3 is a block diagram of an exemplary Client which has applications which store and process data on a Server as shown in FIG. 1.

FIG. 3 is a block diagram illustrating components of an exemplary Client 0120. The Client 0120 may include, but is not limited to plurality of application programs 0310, an NFS protocol program 0320, and a network interface 0330. Application programs 0310 generates metadata operations and read/write operations. The NFS protocol program 0320 is responsible for implementing Client functionality of the NFS protocol including which metadata operations and read/write operations are sent to the Server 0110. The network interface 0330 connects the Client 0120 via the network 0100 to communicate with the Server 0110.

Figure 4:
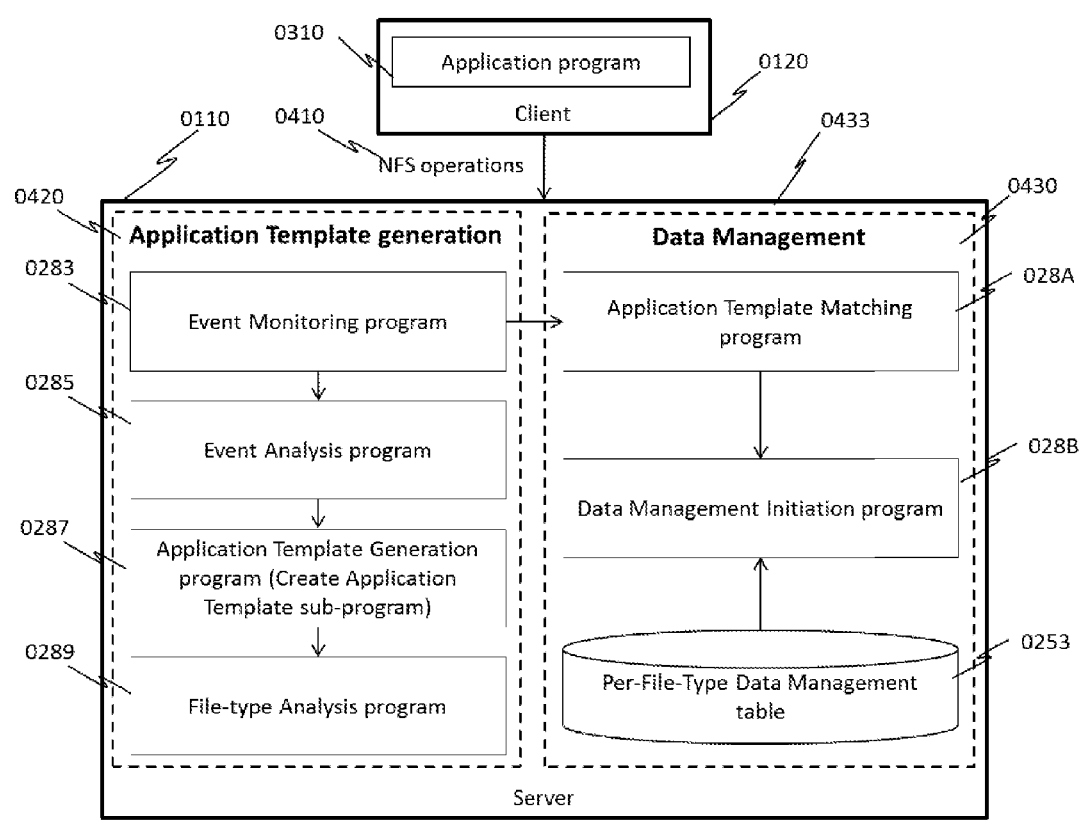
FIG. 4 illustrates a logical flow between a Client and a Server according to the first embodiment of the present invention.

FIG. 4 is a logical flow diagram between a Client 0120 and a Server 0110 according to the first embodiment of the present invention. In FIG. 4, the exemplary flow from application program 0310 on a Client 0120 to programs loaded in the system memory 0280 of the Server 0110 is shown. The logical flow of the present embodiment is divided into two processes, an Application Template Generation 0420 process and a Data Management process 0430. The NFS operations 0410 from the Clients 0120 are processed by the Application Template Generation 0420 program. The Application Template Generation 0420 process includes an Event Monitoring program 0283, an Event Analysis program 0285, an Application Template Generation program 0287 which also includes a Create Application Template sub-program, and a File-type Analysis program 0289. NFS operations 0410 are monitored by the Event Monitoring program 0283. The monitored events are then processed by the Event Analysis program 0285. The processed information is then used by the Application Template Generation program 0287 to create Application Templates 0286 which will be described in further detail below. Further, the File-type Analysis program 0289 creates the FTAAT 0288. The Data Management process 0430 includes an Application Template Matching program 028A and a Data Management Initiation program 028B. The application Template Matching program 028A periodically refers to the AEHT 0284 to perform application template matching and calls the Data Management Initiation program 028B if required. It also uses the Create Application Template sub-program of Application Template Generation program 0287 to create a temporary Application Template. The Data Management Initiation program 028B verifies if a file is ready for data management by referring to the FTAAT 0288 and performs a data management action by referring to the pre-defined PFTDMT 0253 from the storage volume 0250. It also creates updates and reads from the PDMT 0254.

FIG. 5 illustrates an exemplary GEHT 0282. The GENT 0282 may include, but is not limited to, the following information stored in correspondence: an Event ID 0510, a File name (e.g., full path) 0520, an Application-ID 0530, an Event 0540, and a Time of Event 0550. Further, the Application-ID 0530 may further specify a NFS Client IP address 0531, a NFS Client ID 0532, and a NFS open_owner4 (Process ID/Thread ID) 0533. The Event ID 0510 uniquely identifies an event in the Server 0110. The File name (full path) 0520 uniquely identifies a file in the file system namespace. The NFS Client IP address 0531 and NFS Client ID 0532 together uniquely identify a specific Client 0120. The NFS open_owner4 (Process ID/Thread ID) 0533 uniquely identifies an application program running on a specific Client 0120. The Application-ID 0530 uniquely identifies an application program 0310 which is global to all Clients 0120. The Event 0540 is the name of the event (e.g., CREATE, OPEN, REMOVE, WRITE, READ or the like) and the Time of Event 0550 is the time at which the corresponding event was recorded in the Server 0110.

Figure 6:
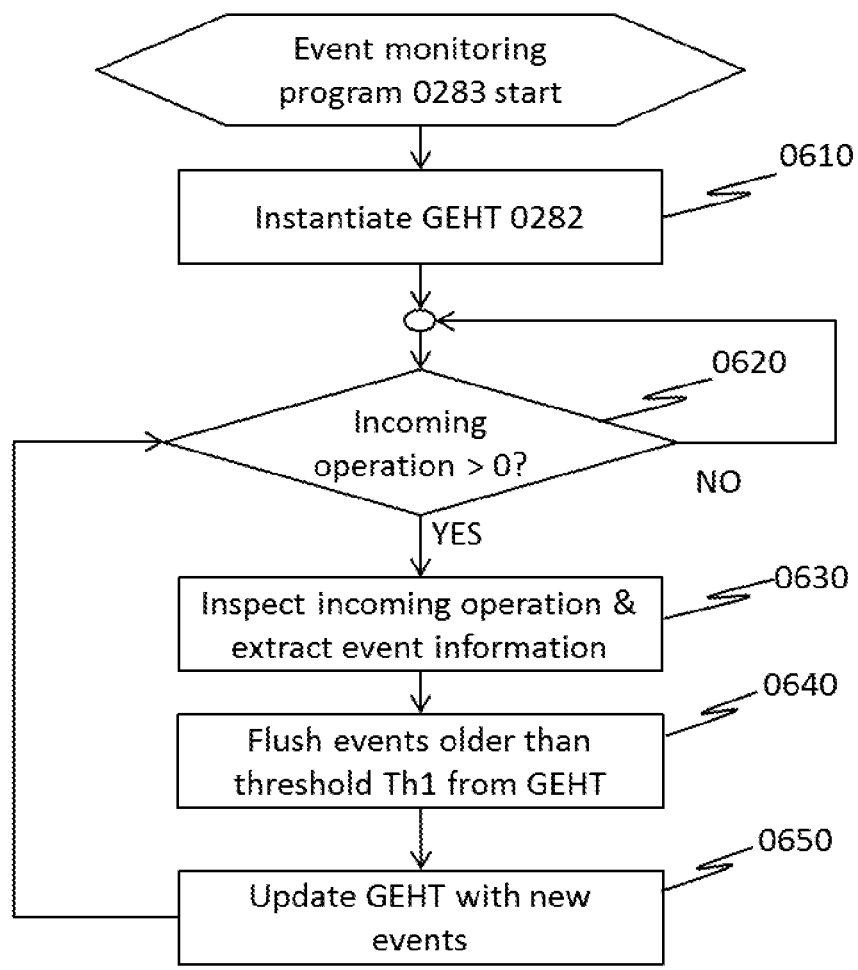
FIG. 6 is a flow diagram of an event monitoring process according to the first embodiment of the present invention.

FIG. 6 is a flow diagram of an event monitoring process according to the first embodiment of the present invention which creates and populates the GEHT 0282 with event information by the Event Monitoring program 0283. First, in step 0610 of the process flow of the event monitoring program 0283, a GEHT 0282 is instantiated. In other words, if no GEHT 0282 has been previously created, then a GEHT 0282 is created in the system memory 0280. In the next step 0620, the program iteratively checks if there is any incoming NFS operation 0410 at the Server 0110 and loops to wait to receive an NFS operation 0410. If YES at step 0620, the incoming NFS operation 0410 is inspected and the required event information is extracted therefrom in step 0630. This event information may include, but is not limited to the file name (full path), the event name (e.g., CREATE, OPEN, REMOVE, WRITE or READ etc.), the time of the event, the NFS Client IP address, the NFS Client ID, and the NFS open_owner4 fields from the NFS operation 0410. Then in step 0640, any events older than a specified threshold "Th1" are deleted from the GEHT 0282. All thresholds described herein can be defined statically based on the relevant target application or can be made configurable for system administrators to allow for tunable accuracy.

The process flow then proceeds to step 0650, and the GEHT 0282 is updated with new events. After step 0650, the event monitoring program 0283 process flow loops back to step 0620. Accordingly, a GEHT 0282 such as that shown in FIG. 5 can be filled with event information extracted from multiple NFS operations.

Figure 7:
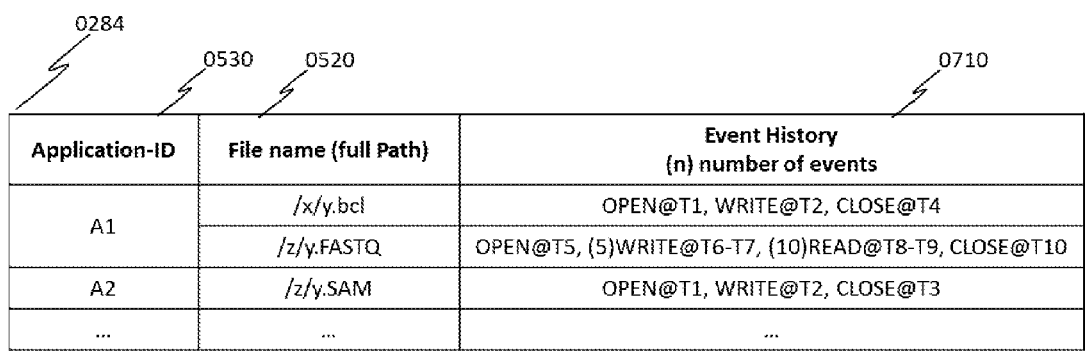
FIG. 7 illustrates an exemplary application event history table according to the first embodiment of the present invention.

FIG. 7 illustrates an exemplary AEHT 0284 according to the first embodiment of the present invention. The AEHT 0284 may include, but is not limited to, the following information stored in correspondence: an Application-ID 0530, a File name (full path) 0520, and an Event History 0710. The Event History 0710 is the history of events recorded for a particular file by each application as represented by the Application-ID 0530. For instance, for Application-ID 0530 A1 in FIG. 7, the file "/x/y.bcl" has the following Event History 0710: OPEN@T1 indicates that the file was opened by A1 at time T1, WRITE@T2 indicates that a write to file "/x/y.bcl" was performed by A1 at time T2 and CLOSE@T3 indicates the file "/x/y.bcl" was closed by A1 at time T4. If there has been more than 1 similar event consecutively performed by an application on the same file, it is represented in the brackets as "(n)" indicating that "n" events of that type were consecutively performed. For example, application with Application-ID 0530 A1 performs (5)WRITE@T6-T7 on the file "/z/y.FASTQ". Here, (5)WRITE@T6-T7 indicates there were 5 consecutive writes from time T6 to time T7 by A1 on file "/z/y.FASTQ".

Figure 8:
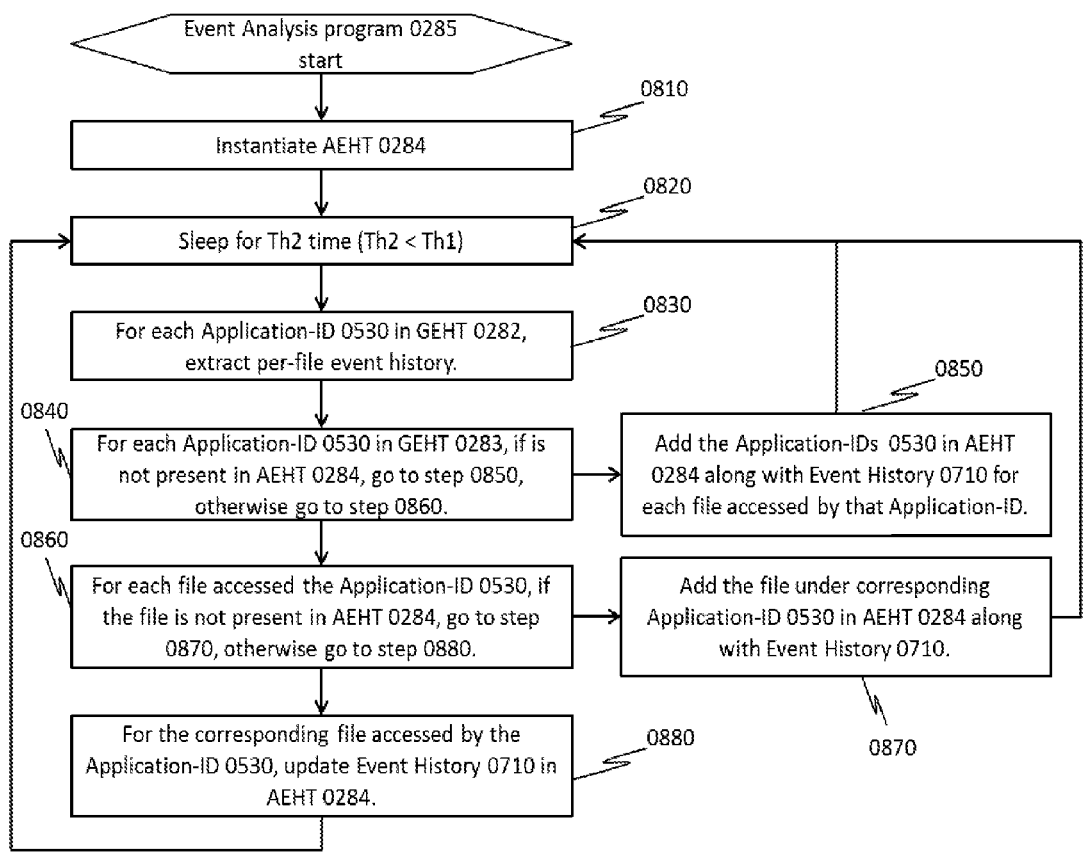
FIG. 8 is a flow diagram of an event analysis process according to the first embodiment of the present invention.

FIG. 8 is a flow diagram of an event analysis process according to the first embodiment of the present invention which creates and populates the AEHT 0284 with event history information by the Event Analysis program 0285. First in step 0810 of the process flow of the event analysis program 0284, an AEHT 0284 is instantiated. In other words, if no AEHT 0284 has been previously created, then a AEHT 0284 is created in the system memory 0280. In step 0820, the program sleeps for a time period equal to a second specified threshold Th2 where "Th2"<"Th1". Here, "Th2" is less than "Th1" to ensure that older events are completely processed before they are flushed from the GEHT 0282 by the event monitoring program 0283. In step 0830, the event analysis program 0285 loops for each Application-ID 0530 in the GEHT 0282 and extracts per-file event history. In other words, the events are organized on a file-basis and application-basis. At step 0840, and the process flow splits into two paths which may be implemented as a multi-threaded program, for example. In step 0840, for each Application-ID 0530 in the GEHT 0283, if it is not present in the AEHT 0284, the program proceeds to step 0850. For all other Application-IDs 0530, the program proceeds to step 0860 as shown in FIG. 8.

For one or more threads which proceed to step 0850, the event analysis program 0285 inserts the Application-IDs 0530 along with each of corresponding accessed file and Event History 0710 in to the AEHT 0284. Each of the threads which completes step 0850 then proceeds back to step 0820.

For one or more threads which proceed to step 0860, for each file accessed by the corresponding Application-ID 0530, if it is not present in the AEHT 0284, the program proceeds to step 0870. For all other files, the program proceeds to step 0880. In step 0860, the program may further split into two paths. For one or more threads which proceed to step 0870, the file is inserted under corresponding Application-ID 0530 in the AEHT 0284 along with Event History 0710. Each thread which completes step 0870 proceeds back to step 0820 as shown in FIG. 8.

For one or more threads which proceed to step 0880, in the corresponding file accessed by the Application-ID 0530, the Event History 0710 is updated in the AEHT 0284. Each thread which completes step 0880 then proceeds back to step 0820. Accordingly, a AEHT 0284 such as that shown in FIG. 5 can be filled with event history information in accordance with the GEHT 0282.

FIG. 9 illustrates an exemplary Application Template 0286 according to the first embodiment. The application template may include, but is not limited to, the following information in correspondence with an APP-Template-ID 0910: an Event #0920, a File type 0930, and Event Details 0940. Event #0920 is the index for the events in the Application Template 0286. File type 0930 is the type or extension of the file to which the particular event is directed. Event Details 0940 may include, but are not limited to CREATE, OPEN, REMOVE, WRITE, READ, LOOP or the like. As an example, if the Event Details 0940 is LOOP with an Event #0920 as "X", the following rows will have Event #0920 in the form of "X.m" where "m" represents sub-indices indicating that the row is part of a particular LOOP. Accordingly, each Application Template 0286 is a time-based or sequential arrangement of file types and event details stored in correspondence.

Figure 10:
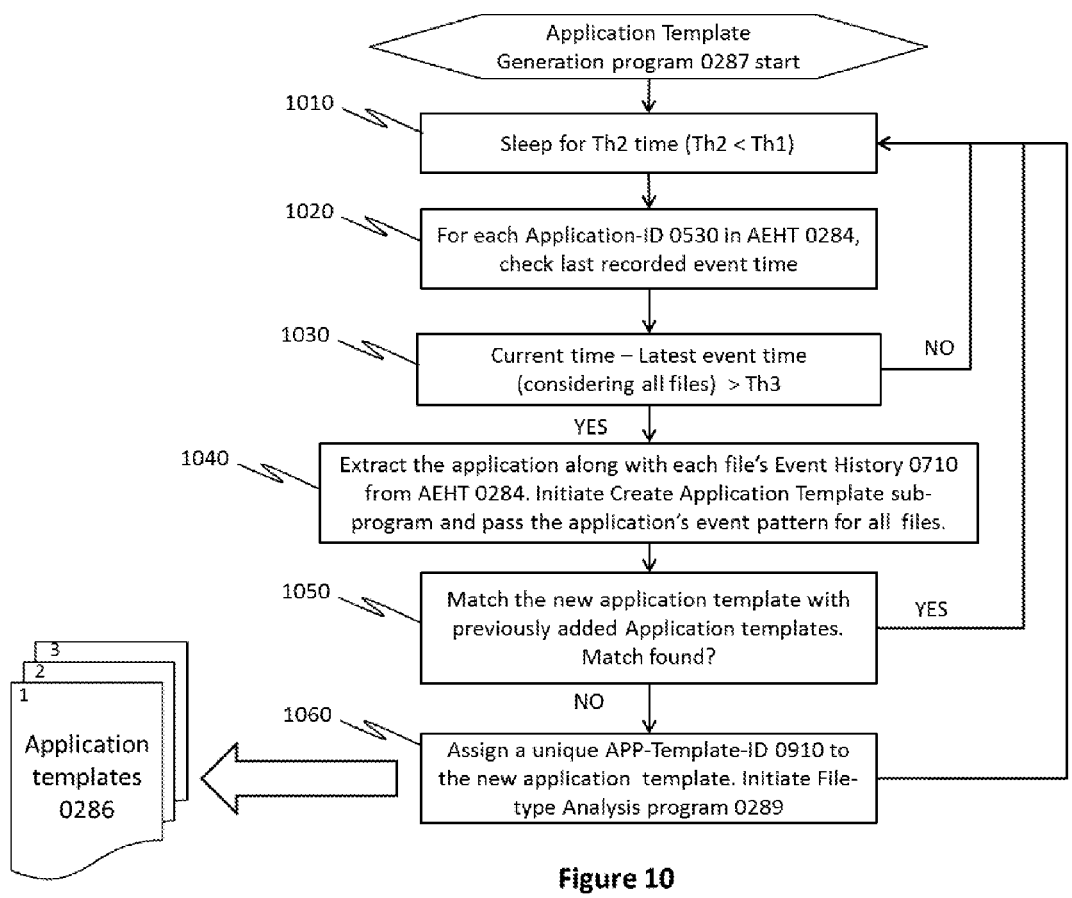
FIG. 10 is a flow diagram of an application template generation process according to the first embodiment of the present invention.

FIG. 10 is a flow diagram of an application template generation process according to the first embodiment of the present invention as performed by Application Template Generation program 0287. In step 1010, the Application Template Generation program 0287 sleeps for a time period equal to "Th2" where "Th2"<"Th1" which provides the benefit noted above to ensure that older events are completely processed before they are flushed from the GEHT 0282. Then at step 1020, for each Application-ID 0530 in the AEHT 0284, the latest event recorded is checked. In step 1020, the application template generation program 0287 may be split into multiple threads where each thread processes an Application-ID 0530 in the AEHT 0284. In step 1030, for the corresponding Application-ID 0530, if the current time minus the latest event time, considering all files, is greater than "Th3", where "Th3" is a specified third threshold, the process flow proceeds to step 1040. This is used as an indication that the corresponding application has completed. Otherwise, the Application Template Generation program 0287 proceeds back to step 1010.

In step 1040, the Application Template Generation program 0287 extracts the corresponding application along with each accessed file's Event History 0710 from the AEHT 0284. Further, a Create Application Template sub-program is initiated to perform further processing which will be described below with respect to FIG. 11. During initiation, the application's event pattern for all the accessed files are passed to the Create Application Template sub-program. the Create Application Template sub-program uses the event patterns for all the accessed files and returns a new Application Template 0286. The Application Template Generation program 0287 then proceeds to step 1050. In step 1050, the new Application Template 0286 is matched with previous Application Templates 0286. For instance, the application templates could be matched with a simple string matching algorithm or an advanced template matching algorithm could be implemented as one of ordinary skill in the art would recognize. If a match is determined, the existence of a match indicates that the new application template 0286 is a replica of an existing application template 0286 and need not be added. In that case, the Application Template Generation program 0287 proceeds back to step 1010. If a match is not found, in step 1060, the new Application Template 0286 is allocated with a unique APP-Template-ID 0910 and is added in the system memory 0280 of the Server 0110. Further, the Application Template Generation program 0287 initiates the File-type Analysis program 0289. Accordingly, an application template 0286 as shown in FIG. 9 can be generated according to the process flow shown in FIG. 10.

Figure 11:
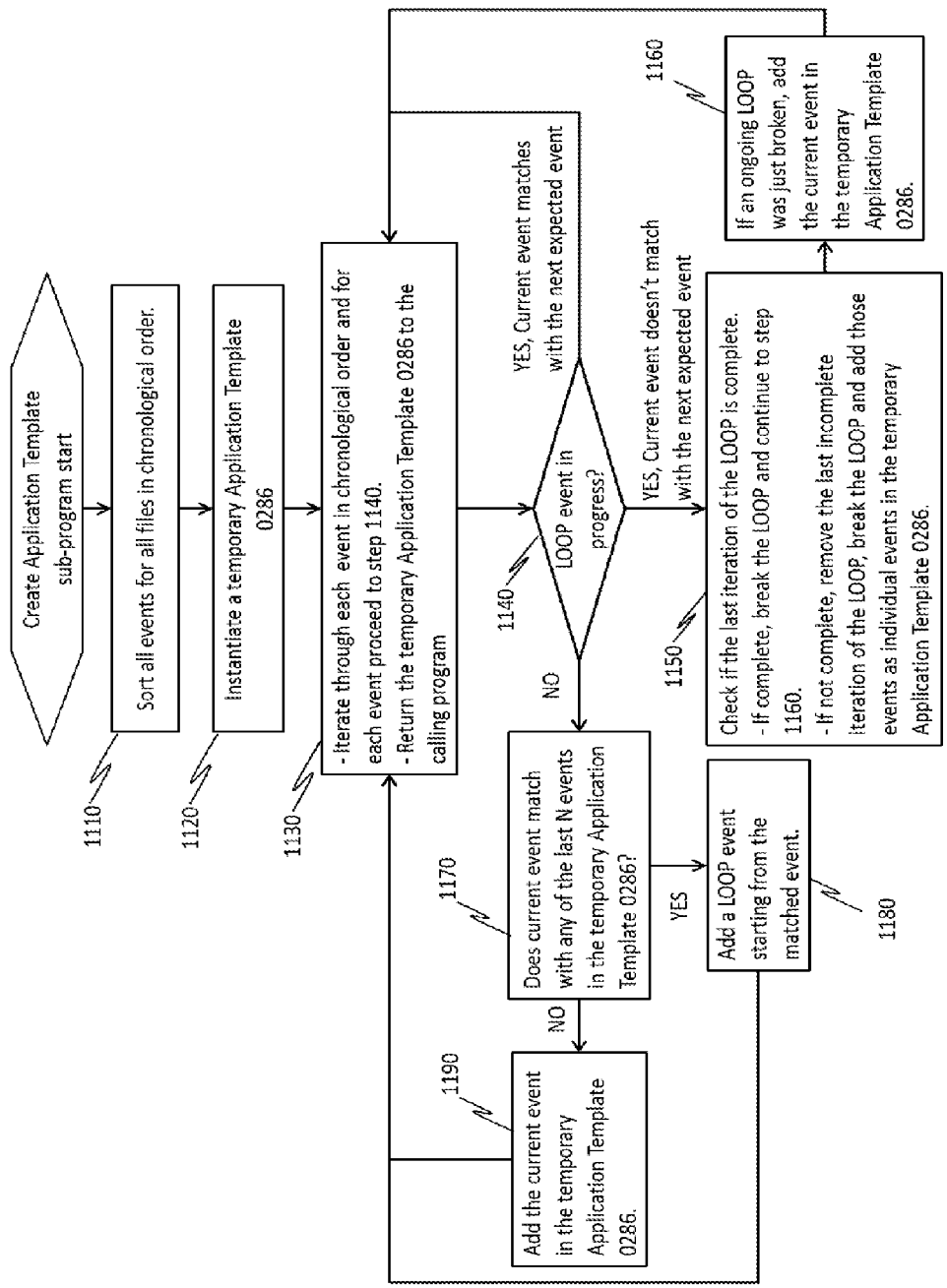
FIG. 11 is a flow diagram of a create application template sub-process of the application template generation process according to the first embodiment of the present invention.

FIG. 11 is a flow diagram of a create application template sub-process according to the first embodiment of the present invention as performed by the Create Application Template sub-program which is initiated by the Application Template Generation program 0287. In FIG. 11 at step 1110, the Create Application Template sub-program sorts all events for all supplied files in chronological order. Proceeding to step 1120, a temporary Application Template 0286 is instantiated. Namely, a temporary Application Template is created in the system memory. Then in step 1130, the Create Application Template sub-program iterates through each event in chronological order and for each event it proceeds to step 1140.

Step 1140 checks if there is a LOOP event in progress by referring to the temporary Application Template 0286. If YES at step 1140 and the current event in iteration matches with the next expected event in the LOOP, the process flow proceeds back to step 1130 to continue the iteration. Also, during this proceeding, the next expected event is updated by referring to the temporary Application Template 0286. This logic may be implemented with a local variable in the Create Application Template sub-program. In step 1140, if YES and the current event in iteration does not match with the next expected event in the LOOP, the process flow proceeds to step 1150. At step 1150, it is checked whether the last iteration of the LOOP is complete. If the last iteration is complete, the LOOP is broken by incrementing the Event #0920 to the next integer index. Then the process flow proceeds to step 1160. If not complete in step 1150, the last incomplete iteration of the LOOP is removed, the LOOP breaks and those events are added as individual events in the temporary Application Template 0286. The process flow then proceeds to step 1160. In step 1160, if an ongoing LOOP was just broken in step 1150, the process flow adds the current event in the temporary Application Template 0286 and then proceeds back to step 1130 to continue the iteration. If NO in step 1140, the process flow proceeds to 1170. In step 1170, the process flow checks if the current event matches with any of the last N events in the temporary Application Template 0286. If YES in step 1170, the process flow proceeds to step 1180. In step 1180, a LOOP event is added before the matched event in the temporary Application Template 0286 and the Event #0920 for all the events starting from the matched event in the Application Template 0286 are updated with sub-indices as described in FIG. 9. The next expected event in the LOOP is updated to the following event after the matched event. Then the process flow proceeds back to step 1130 to continue iteration. If NO in step 1170, the process flow proceeds to step 1190 and adds the current event in the temporary Application Template 0286 and proceeds back to step 1130 to continue iteration.

As shown in FIG. 11, at step 1130, when the iteration completes, if there is a LOOP event in progress in the temporary Application Template 0286 and if all the expected events in the LOOP's iteration are not complete, the program removes the last incomplete iteration of the LOOP, breaks the LOOP and adds those events as individual events in the temporary Application Template 0286. Then, the Create Application Template sub-program returns the Application Template 0286 to the application template generation program 0287.

Figure 12:
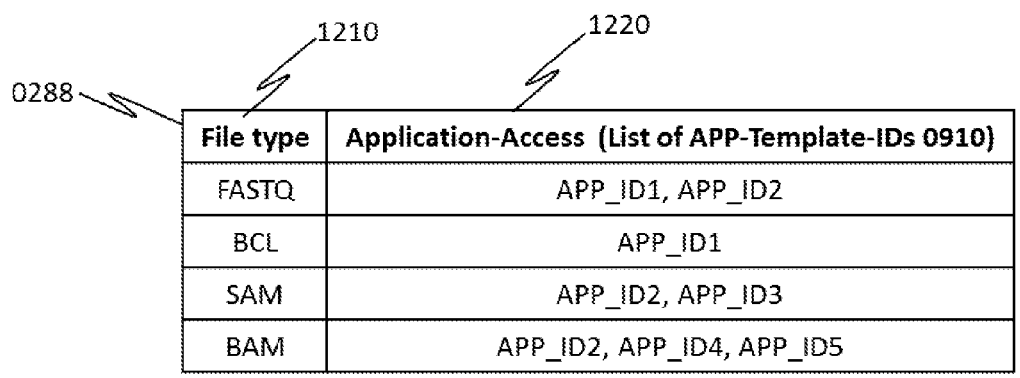
FIG. 12 illustrates an exemplary file-type-application-access table according to the first embodiment of the present invention.

FIG. 12 illustrates an exemplary FTAAT 0288. The FTAAT may include, but is not limited to, the following information stored in correspondence: a File type 1210 and an Application-Access (e.g., a list of APP-Template-IDs 0910) 1220. The File type 1210 is indicates a particular file type, data object types, file extension or any other attribute of a file which represents the format of the file known to all programs in the system memory 0280 of the Server 0110. The Application-Access 1220 is a list of APP-Template-IDs 0910 which have accessed the corresponding File type 1210. This indicates that the corresponding File type 1210 is expected to be accessed by applications whose templates are same as any one of the APP-Template-IDs in the Application-Access 1220 list.

Figure 13:
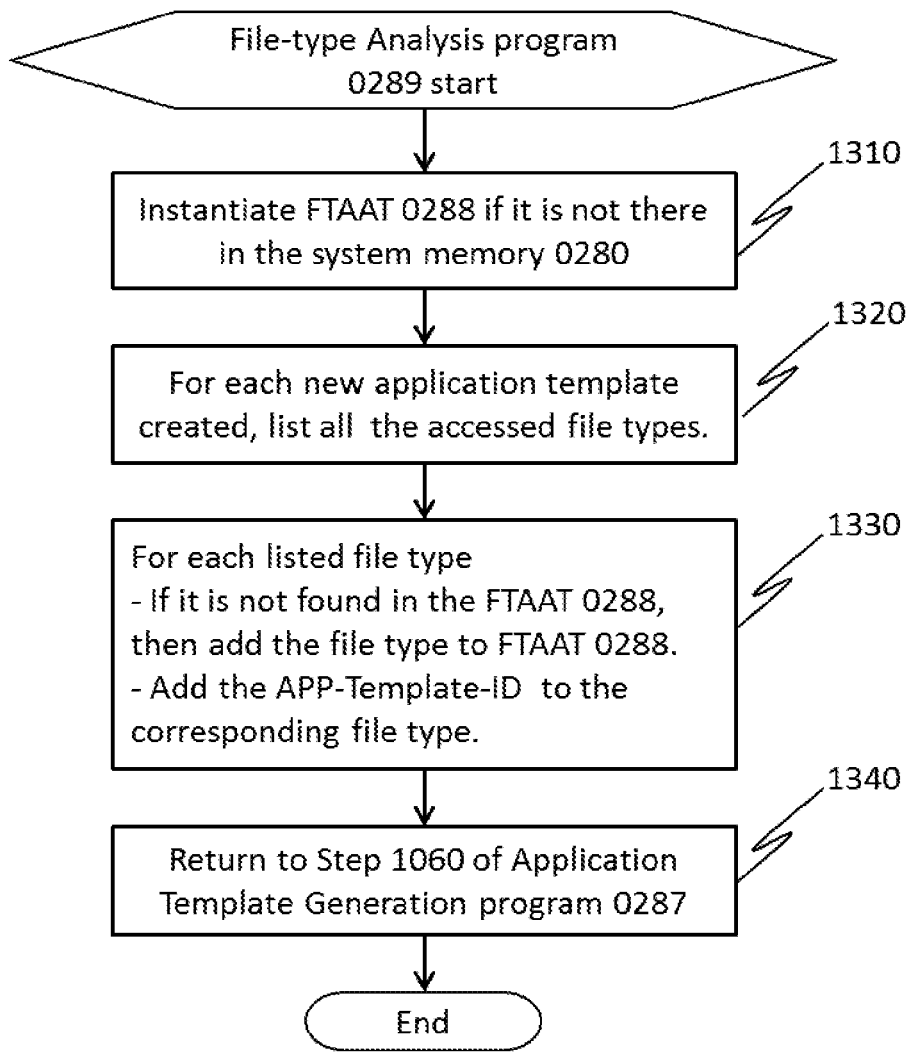
FIG. 13 is a flow diagram of a file-type analysis process according to the first embodiment of the present invention.

FIG. 13 is a flow diagram of a file-type analysis process according to the first embodiment of the present invention as performed by the File-type Analysis program 0289. When a new Application Template is created by the Application Template Generation program 0287, the File-type Analysis program 0289 is initiated to update the FTAAT 0288 to reflect any new changes in relationships between file types and Application Templates. In step 1310, if the FTAAT 0288 is not present in the system memory 0280, then the FTAAT 0288 is instantiated. In other words, if no FTAAT 0288 has been previously created, then a FTAAT 0288 is created in the system memory 0280. In step 1320, for the new Application Template created, all the accessed file types are listed by referring to the file types 0930 listed in the newly created Application Templates. While the foregoing refers to one new Application Template, it is possible that plural Application templates can be created at this time as well.

Next at step 1330, for each listed file type 1210, it is checked whether the listed file type 1210 is in the FTAAT 0288. If the file type accessed by newly created Application Template is NOT present in FTAAT 0288, the program updates the FTAAT 0288 by adding a new row in the FTAAT 0288 with the corresponding file type, for example, BAM, FASTQ, etc. The program adds the Application Template ID 0910 of the newly create Application Template in the FTAAT 0288 under Application-Access 1220 column.

Further, at step 1330, if the file type 1210 is already present in the FTAAT 0288, the File-type Analysis program 0289 adds the APP-Template-ID 0910 of the newly created Application Template in the FTAAT 0288 under Application-Access 1220 column. In step 1340, the File-type Analysis program 0289 returns to Step 1060 of Application Template Generation program 0287. Accordingly, the FTAAT 0288 can be populated with the list of APP-Template-IDs 0910 for each file type 1210 as shown in FIG. 12. As shown in FIG. 4, the processing by the file-type analysis program 0289 ends the Application Template generation 0420.

Figure 14:
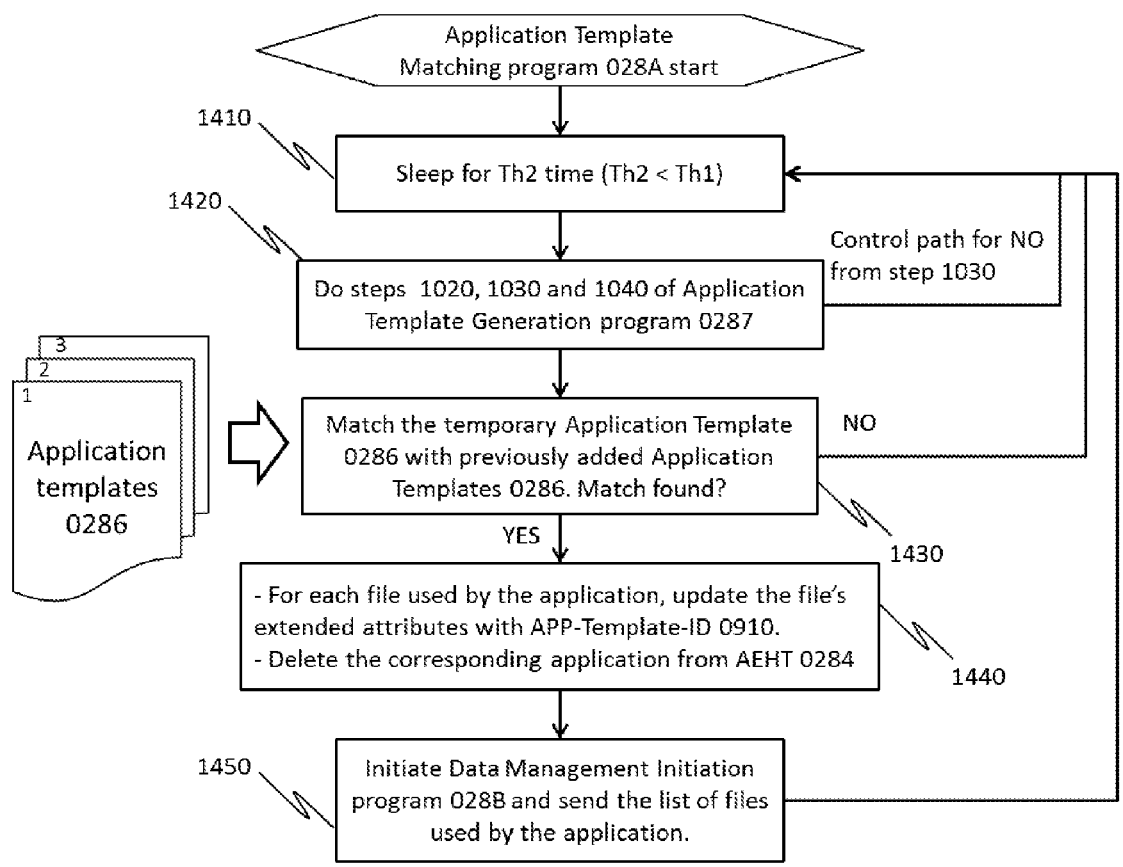
FIG. 14 is a flow diagram of an application template matching process according to the first embodiment of the present invention.

As shown in FIG. 4, the logical flow of the first embodiment moves from the Event Monitoring program 0283 of the Application Template Generation 0420 to Data Management Processing 0430 beginning with the Application Template Matching program 028A. FIG. 14 is a flow diagram of an application template matching process according to the first embodiment of the present invention as performed by the Application Template Matching program 028A. Here, the Application Template Matching program 028A attempts to determine whether a temporary application template containing a set of files and events matches one or more previously generated application templates In step 1410, the Application Template Matching program 028A sleeps for a period of time equal to "Th2" where "Th2"<"Th1" so that the Application Template Matching program 028A performs the following steps periodically. Then in step 1420, the process flow described at steps 1020, 1030 and 1040 of the Application Template Generation program 0287 are performed. A control path for NO from step 1030 of Application Template Generation program 0287 is provided in the context of the Application Template Matching program 028A. In this case, the program proceeds back to step 1410.

Figure 17:
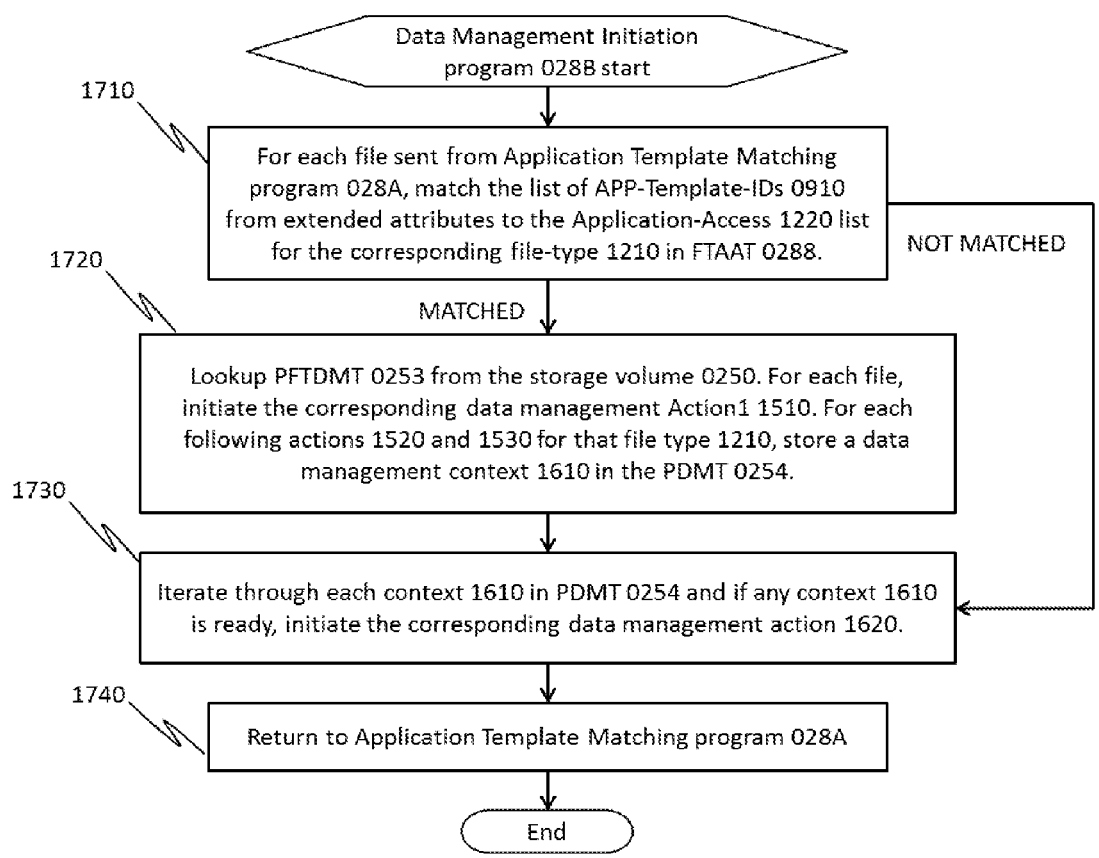
FIG. 17 is a flow diagram of data management initiation process according to the first embodiment of the present invention.

Otherwise at step 1420, if the process flow does not return to step 1410, a temporary Application Template 0286 is returned from the Create Application Template sub-program. Then, the temporary application template 0286 is passed to the next step 1430. In step 1430, the temporary Application Template 0286 is matched against the previously added Application Templates 0826. The matching is similar to that shown in step 1050 of FIG. 10. However, the particular matching algorithm implemented is not critical and no specific matching method, technique, algorithm, etc. is required. If NO in step 1430, and no match is found then the process flow proceeds back to step 1410. If YES in step 1430, and a match is found then the flow proceeds to step 1440. In step 1440, for each file used by the application as found in step 1430, the application template matching program 028A updates the file's extended attributes with APP-Template-ID 0910. Further, the application template matching program 028A deletes all information related to the corresponding application in AEHT 0284 by looking up the Application-ID 0530 column in AEHT 0284. In step 1450, the application template matching program 028A initiates the Data Management Initiation program 028B, which is shown in FIG. 17, and passes the list of files used by the application. After the Data Management Initiation program 028B has completed its respective processing, the Application Template Matching program 028A proceeds back to step 1410.

FIG. 15 illustrates an exemplary PFTDMT 0253 stored in the storage volume 0250 according to the first embodiment of the present invention. The PFTDMT may include, but is not limited to, the following information stored in correspondence: a File type 1210, an Action1 1510, an Action2 1520 and an Action3 1530. However, the present invention is not limited to the number of actions which are maintained for each file type 1210. Instead, the number of actions may depend on a data life-cycle management policy that is pre-defined by a system administrator. In FIG. 15, the action columns 1510, 1520 and 1530 represents the primary, secondary and tertiary actions for the corresponding file type 1210. Action1 1510 is performed as soon as the corresponding file is ready for data management as determined by the Data Management Initiation program 028B. All other subsequent actions (e.g., Action2 1520 and Action3 1530 in FIG. 15) may be performed at the future time as respectively specified in the PFTDMT 0253. For example, the policy for the file type "FASTQ" is that it should be first compressed, then migrated to a cheaper storage tier and then finally archived. As another example, the file type "BCL" is to be archived as soon as it is ready for data management as determined by the Data Management Initiation program 028B.

FIG. 16 illustrates an exemplary PDMT 0254 according to the first embodiment of the present invention which is created, updated and read by the Data Management Initiation program 028B and stored in the storage volume 0250. The PDMT 0254 may include, but is not limited to, the following information stored in correspondence: a Context #1610, a File name 0520 and an Action 1620. The context #1610 is a unique identifier of a pending data management task in the Server 0110. The action 1620 is the specific action to be performed on the corresponding file which is identified by file name 0520 as represented in the PDMT 0254. Each action 1620 also specifies a time when the action thereof is to be performed. Namely, each action can be specified by a policy and the policy further contains timing information as to when each action is to be performed on the associated file data. As such, the PDMT 0254 maintains a list of data management tasks to be executed by the Server 0110.

FIG. 17 is a flow diagram of data management initiation process according to the first embodiment of the present invention as performed by the Data Management Initiation program 028B. First at step 1710, for each file sent from the Application Template Matching program 028A, the program matches the list of APP-Template-IDs 0910 from the extended attributes thereof to the Application-Access 1220 list for the corresponding file-type 1210 in FTAAT 0288. If no match exists, the Data Management Initiation program 028B proceeds to step 1730. If match exists as determined in step 1710, the process flow proceeds to step 1720. In step 1720, the Data Management Initiation program 028B refers to the PFTDMT 0253 stored in the storage volume 0250. Then, for each file, the corresponding data management action (e.g., Action1 1510) is initiated. Then, for each of the following actions (e.g., action2 1520 and action3 1530) for that file type 1210, the Data Management Initiation program 028B stores a data management context with context #1610 in the PDMT 0254. In step 1730, the Data Management Initiation program 028B iterates through each data management context with a context #1610 in PDMT 0254, and if any context with a context #1610 is ready, the Data Management Initiation program 028B initiates the corresponding data management action in Action 1620 column. The Data Management Initiation program 028B then proceeds to step 1740 where the logical flow shown in FIG. 4 returns back to the Application Template Matching program 028A at step 1450 of FIG. 14.

Accordingly, application templates are generated according to the NFS operations performed by the Server 0110 in accordance with the application template generation 0420 shown in FIG. 4. Further, proactive and fully automated data management 0430 can be realized with the processing flow described above to maintain a pending data management table in accordance with one or more specified data management actions on a per-file-type basis. Therefore, by configuring a Server 0110 as described above in the first embodiment, fully automated proactive, and fine-grained, application aware data management can be realized.

Second Embodiment

A second embodiment of the present invention will be illustrated and described with reference to FIGS. 18-27 and 31. The description will mainly focus on the additions and some differences from the first embodiment. In the first embodiment, the Application Templates 0286 define the beginning and ending of an application completing one or more NFS operations as seen by the Server 0110. In the first embodiment, when another application performs NFS operations which match with one of the existing Application Templates 0286, all of the files accessed by that application are chosen for data management. While the first embodiment is directed to solving the problem where each data type or file type is used by a single application, an additional problem exists where files or data are often shared by multiple applications through an application pipeline or more commonly, a "workflow", which involves multiple applications connected through a series of events which define the application workflow. Such a workflow is dependent on the particular technical field of the applications (e.g., genome sequencing, oil and gas exploration, etc.) and the applications being used. In the first embodiment, there is no attempt to connect multiple Application Templates 0286 with exhibit some form of correlation and there is no attempt to connect multiple applications during the Data Management Process 0430 to verify if a workflow is complete.

Figure 31:
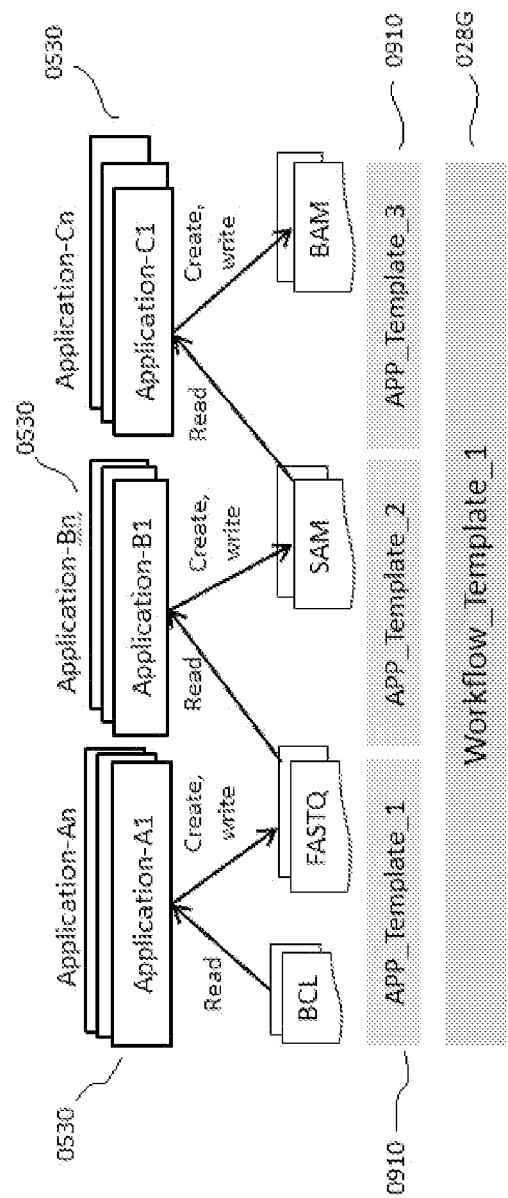
FIG. 31 illustrates an exemplary workflow in relationship to operations performed by applications on files and the organization of the workflow relative to application templates.

The second embodiment is directed to solving the foregoing problem by connecting plural Application Templates 0286 as explained above to create one or more workflow templates and linking currently running applications in order to determine which particular applications are included as part of a given workflow and to match workflow templates to identify when data management actions similar to the first embodiment need to be taken. FIG. 31 shows a conceptual relationship between multiple applications 0530, files, Application Templates 0286 which form a workflow according to the second embodiment.

As shown in FIG. 31, one or more applications such as Applications-A1 to An 0530 read from .BCL file types and then create and write to .FASTQ file types. As explained above in the first embodiment, the events associated with Application-A1, for example, would be organized and identified as the application template APP_Template_1 0910. Further, one of the .FASTQ file types would subsequently be read by Application-B1 0530 and thereafter, Application-B1 0530 would create and write to a .SAM file type. One or more other applications such as Application-Bn 0530 may perform similar operations as shown in FIG. 31 during this time as well. The .SAM file type would then be read by Application-C1 0530 which would thereafter, create and write to a .BAM file type. The events associated with Application-B1, for instance, would be organized as the application template APP_Template_2 0910, according to the procedures of the first embodiment. Similarly, the events associated with Application-C1 would also be organized as the application template APP_Template_3 0910. In the second embodiment, the events relating to the files and different applications are not only monitored to generate Application Templates 0286 but are further correlated and organized into workflows 028G as described as follows.

Figure 18:
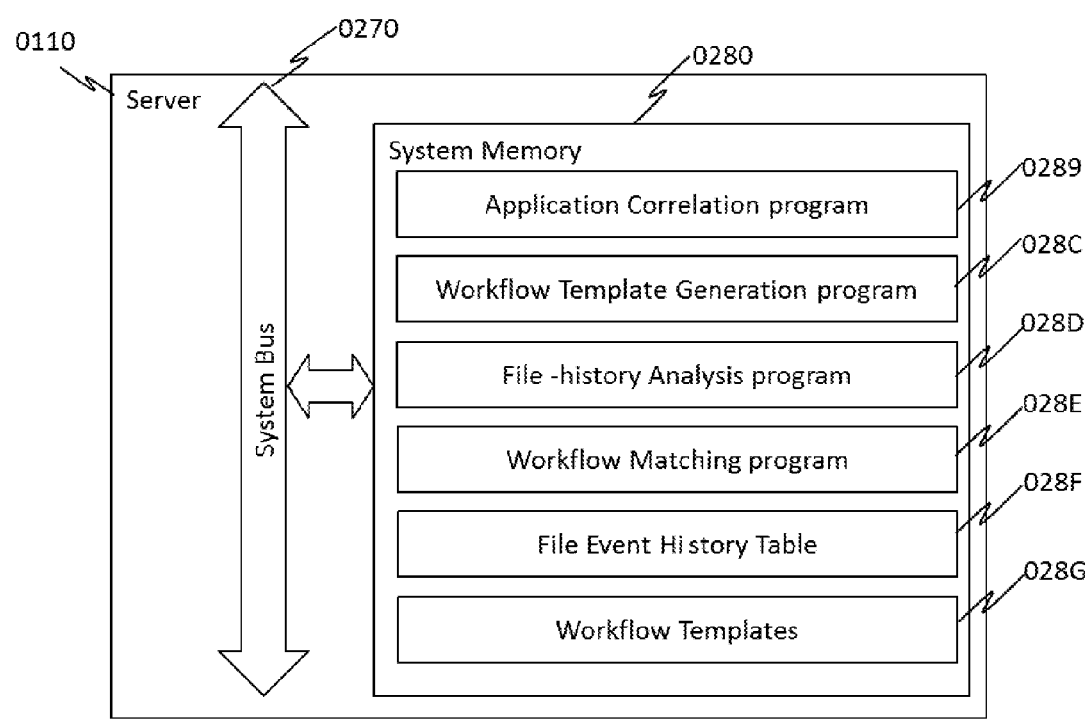
FIG. 18 is a block diagram of an exemplary Server which provides storage management as shown in FIG. 2 according to a second embodiment of the present invention.

FIG. 18 is a block diagram of an exemplary Server which provides storage management as shown in FIG. 2 according to a second embodiment of the present invention which includes additional components added to the Server 0110. The system memory 0280 may additionally include, but is not limited to, an Application Correlation program 0829 which replaces the File-type Analysis program 0829 of the first embodiment, a Workflow Template Generation program 082C, a File-history Analysis program 082D, a Workflow Matching program 082E, a File Event History Table 082F (FEHT), and a Workflow Templates 082G. The FEHT 028F and the Workflow Templates 028G are read and written to by the various programs in system memory 0280 as described below.

Figure 19:
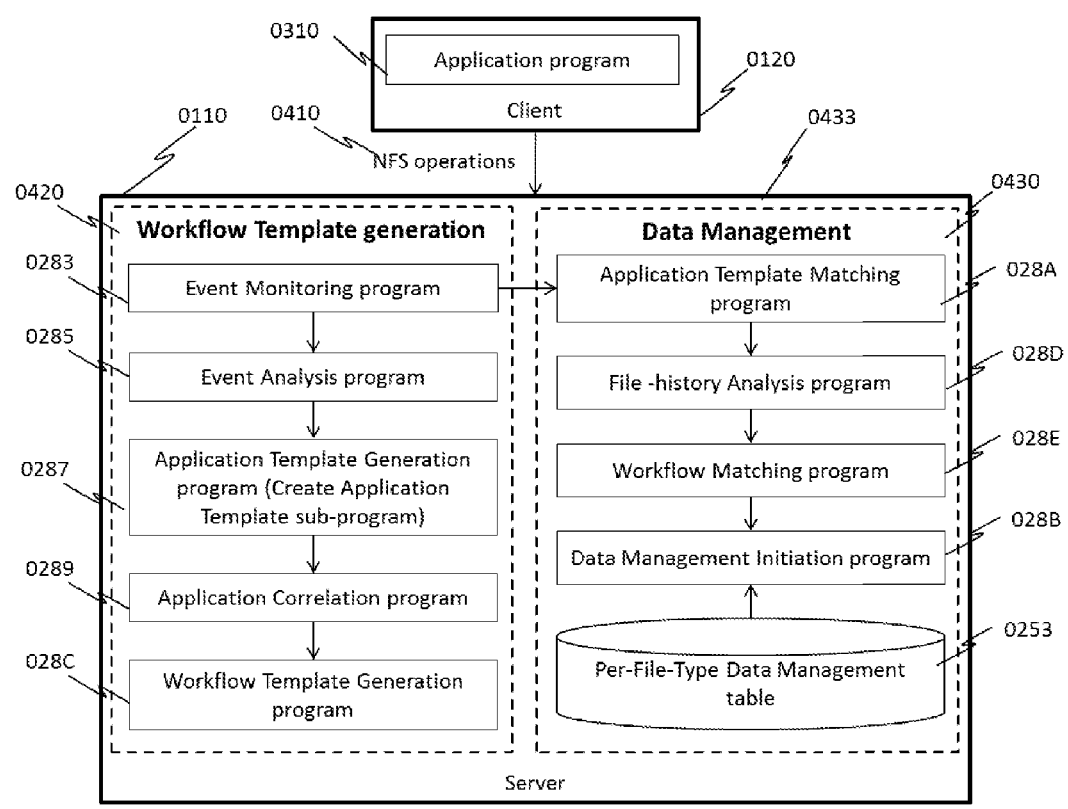
FIG. 19 illustrates a logical flow between a Client and a Server according to the second embodiment of the present invention.

FIG. 19 illustrates a logical flow between a client and a server as a data management system according to the second embodiment of the present invention which includes additional features in the logical flow compared to that FIG. 4. The Application Template Generation 0420 of the first embodiment is replaced with a Workflow Template Generation 0420 process in the second embodiment. The Workflow Template Generation 0420 process includes an Event Monitoring program 0283, an Event Analysis program 0285, an Application Template Generation program 028 including a Create Application Template sub-program, an Application Correlation program 0289 and a Workflow Template Generation program 028C. The application Correlation program 0289 creates the FTAAT 0288 and correlates the Application Templates 0286 through common file-type access. The workflow Template Generation program 028C uses the correlation found by the Application Correlation program 0289 and creates Workflow Templates 028G. The Data Management Process 0430 includes an Application Template Matching program 028A, a File-history Analysis program 028D, a Workflow Matching program 028E and a Data Management Initiation program 028B. The File-history Analysis program 028D tracks the ongoing application workflows and passes the Workflow-File-Set (e.g., a temporary list of files accessed by an application) to the Workflow Matching program 028E. The Workflow Matching program 028E checks if a workflow has completed with the completion of particular application and, if so, passes the files accessed by that workflow to the Data Management Initiation program 028B.

Figure 20:
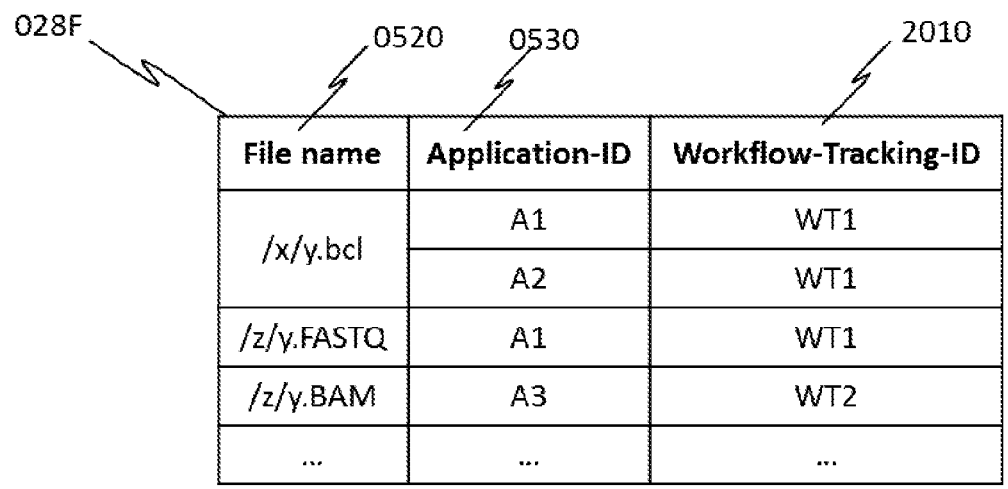
FIG. 20 illustrates an exemplary file event history table according to the second embodiment of the present invention.

FIG. 20 illustrates an exemplary FEHT 028F according to the second embodiment of the present invention. The FEHT 028F may include, but is not limited to the following information stored in correspondence: a File name 0520, an Application-ID 0530 and a Workflow-Tracking-ID 2010. The Workflow-Tracking-ID allows for ongoing application workflows to be tracked through the correlation of accessed files. In particular, as shown in FIG. 20, multiple applications are associated with the file "/x/y.bcl" which indicates that for an associated workflow, multiple applications will access the same file.

Figure 21:
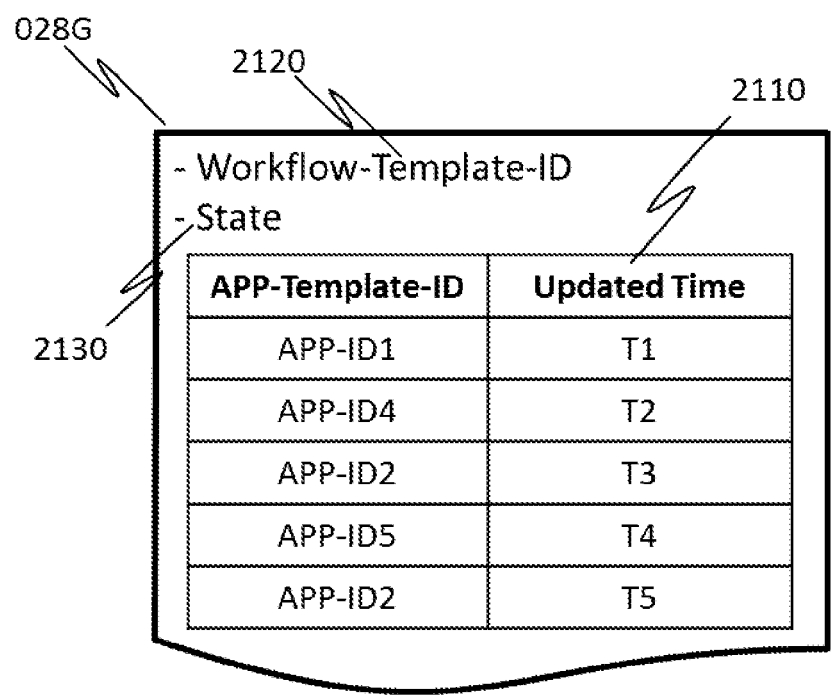
FIG. 21 illustrates an exemplary workflow template according to the second embodiment of the present invention.

FIG. 21 illustrates an exemplary Workflow Template 028G according to the second embodiment of the present invention. The workflow template 028G may include, but is not limited to, the following information stored in correspondence: a Workflow-Template-ID 2120, a State 2130, an APP-Template-ID 0910 list and an Updated Time 2110. The Workflow-Template-ID 2120 uniquely identifies a Workflow Template 028G. The State 2130 represent either Ready (R) or Not-Ready (NR) to indicate if a workflow is completely defined or is in the process of being defined. The Updated Time 2110 represents the time at which a particular APP-Template-ID is added to the Workflow Template 028G.

Figure 22:
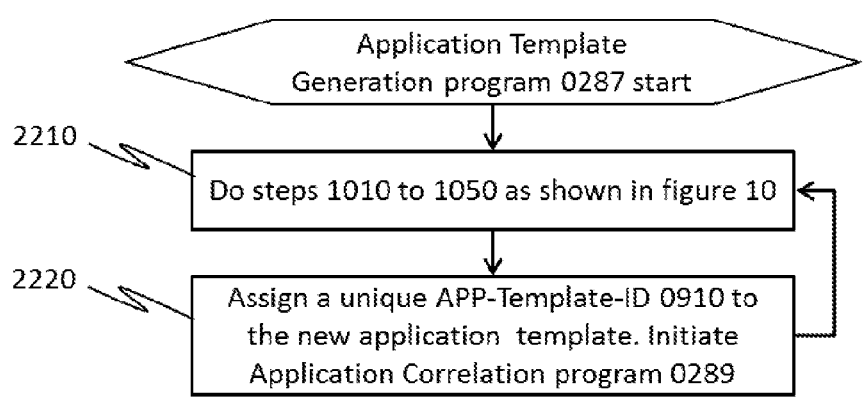
FIG. 22 is a flow diagram of an application template generation process according to the second embodiment of the present invention.

FIG. 22 is a flow diagram of an application template generation process according to the second embodiment of the present invention as performed by the Application Template Generation program 0287 and is a modification to the process flow shown in FIG. 10 of the first embodiment. According to the second embodiment, in the last step 2220, the Application Template Generation program 0287 initiates the Application Correlation program 0289 in contrast to step 1060 in FIG. 10 which initiates the File-type Analysis program 0289. The Application Correlation program 0289 has a process flow which is described as follows.

Figure 23:
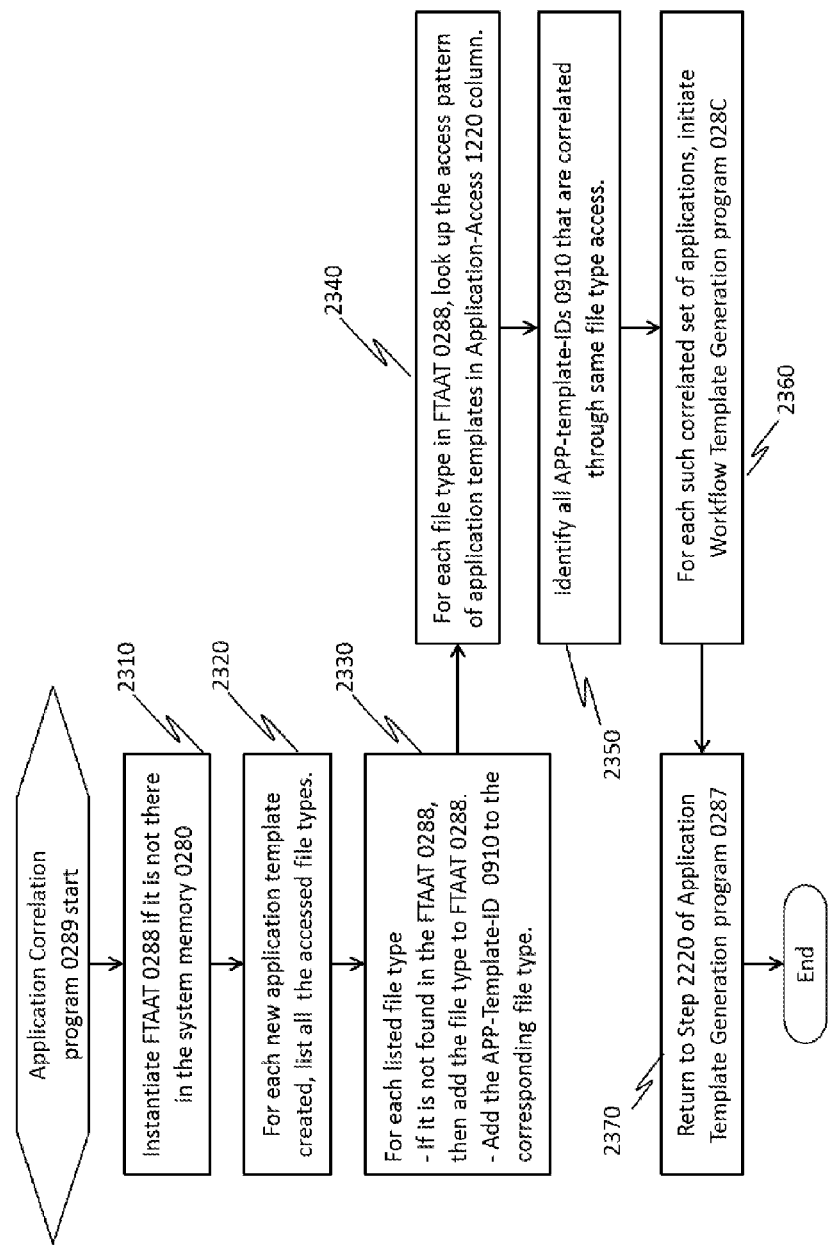
FIG. 23 is a flow diagram of an application correlation process according to the second embodiment of the present invention.

FIG. 23 is a flow diagram of an application correlation process according to the second embodiment of the present invention as performed by Application Correlation program 0289. First at step 2310, if the FTAAT 0288 is not present in the system memory 0280, then the FTAAT 0288 is instantiated in the system memory. In other words, if no FTAAT 0288 has been previously created, then a FTAAT 0288 is created in the system memory 0280. Then the process flow proceeds to step 2320, where for each new Application Template 0286 that is created, the Application Correlation program 0289 lists all the accessed file types

1210. In step 2330, for each listed file type, the Application Correlation program 0289 checks if the listed file type is not found in the FTAAT 0288. If the file type is not found, the file type 1210 is added to the FTAAT 0288. Further, the program adds the APP-Template-ID 0910 to the corresponding file type 1210. In step 2340, for each file type 1210 found in the FTAAT 0288, the Application Correlation program 0289 looks up the access pattern of Application Templates 0286 in the Application-Access 1220 information. Then in step 2350, all APP-template-IDs 0910 are identified that are correlated through the same file type 1210 access. In step 2360, for each such correlated set of applications, the Application Correlation program 0289 initiates the Workflow Template Generation program 028C. When the Workflow Template Generation program 028C completes its process flow, the process flow in FIG. 23 proceeds to step 2370. In step 2370, the Application Correlation program 0289 returns to step 2220 of the Application Template Generation program 0287 of FIG. 22.

Figure 24:
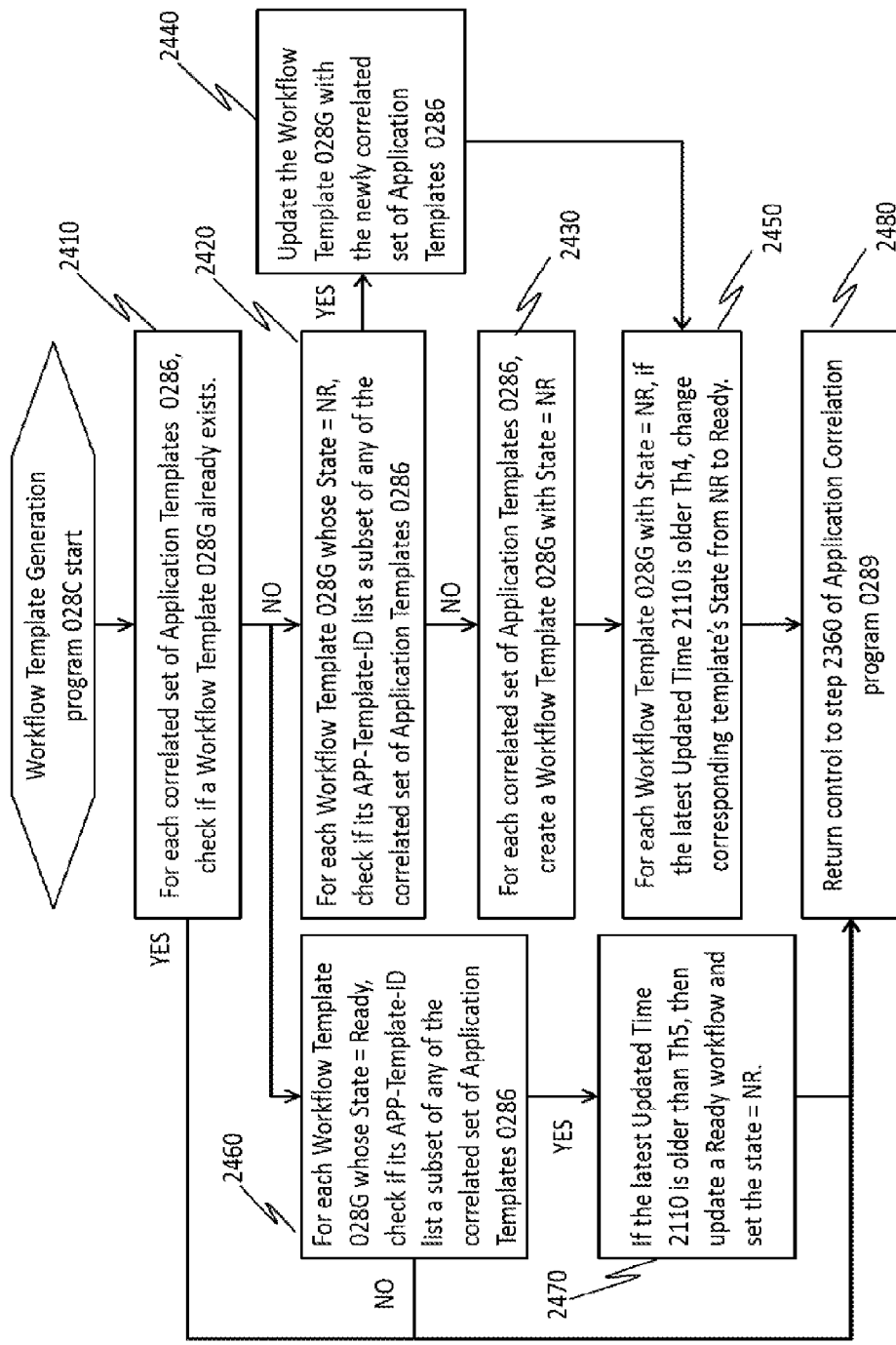
FIG. 24 is a flow diagram of workflow template generation process according to the second embodiment of the present invention.

FIG. 24 is a flow diagram of workflow template generation process according to the second embodiment of the present invention as performed by the Workflow Template Generation program 028C. In step 2410, for each correlated set of Application Templates 0286 as identified by the application correlation program 0289, the Workflow Template Generation program 028C checks if a Workflow Template 028G already exists for the correlated set of application templates 0286. If YES, the Workflow Template Generation program 028C proceeds to step 2480 and the process flow returns to step 2360 of the application correlation program 0289. If NO, the Workflow Template Generation program 028C process flow splits into two paths. One proceeds to step 2420 and the other proceeds to 2460.

In step 2420, for each Workflow Template 028G whose State="NR", the Workflow Template Generation program 028C checks if it's set of APP-Template-ID 0910 lists a subset of any of the correlated set of Application Templates 0286. If NO, the program proceeds to step 2430. In step 2430, for each correlated set of Application Templates 0286, the program creates a new Workflow Template 028G with State=NR. In step 2420, if YES, then at step 2440, the Workflow Template Generation program 028C updates the Workflow Template 028G determined at step 2420 with the newly correlated set of Application Templates 0286. From steps 2430 and 2440, the process flow proceeds to step 2450. In step 2450, for each Workflow Template 028G with State=NR, if the latest Updated Time 2110 in the Workflow Template 028G is older than a threshold "Th4", then the corresponding template's State is changed from "NR" to "R". This indicates the completion of a workflow and the Workflow Template 028G becomes ready for use by the Data Management Process 0430. Then the program proceeds to 2480 which is described above and returns to the application correlation program 0289.

However, in the second path from 2420 which proceeds to step 2460, for each Workflow Template 028G whose State="R", the Workflow Template Generation program 028C checks if it's set of APP-Template-ID 0910 lists a subset of any of the correlated set of Application Templates 0286. If NO, the Workflow Template Generation program 028C proceeds to step 2480 and returns to the application correlation program 0289. If YES, the Workflow Template Generation program 028C proceeds step 2470 where, if the latest Updated Time 2110 in the Workflow Template 028G is older than "Th5", then the program changes the state from "R" to "NR". This indicates that a Workflow Template 028G previously found to be ready for the Data Management process 0430 must wait a for a minimum period of time equal to "Th4" before the Workflow Template Generation program 028C may find it is ready for Data Management process 0430 (i.e., due to a change in application workflow, an application software update, etc.). Finally, in step 2480, the process flow of the Workflow Template Generation program 028C returns to step 2360 of the Application Correlation program 0289.

Figure 25:
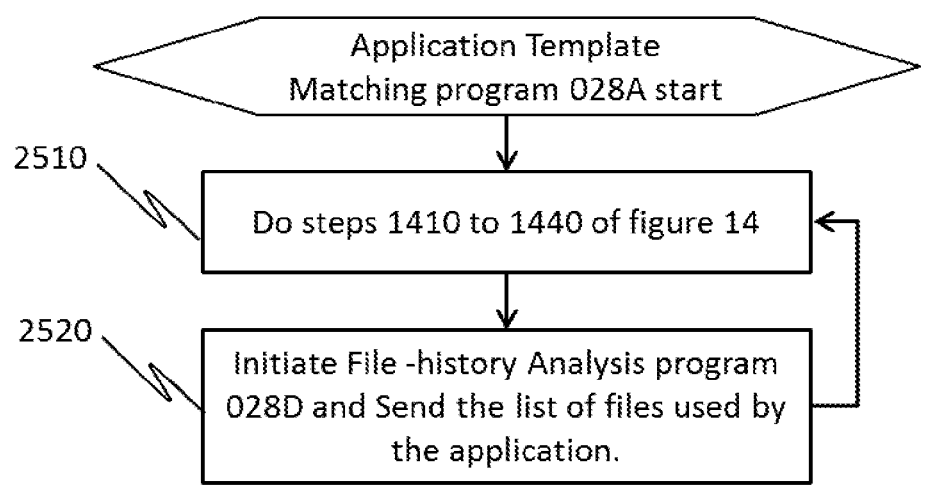
FIG. 25 is a flow diagram of an application template matching process according to the second embodiment of the present invention.

FIG. 25 is a flow diagram of an application template matching process according to the second embodiment of the present invention as performed by the Application Template Matching program 0287 and is a modification to the process flow shown in FIG. 14. According to the second embodiment, at step 2510, steps 1410 to 1440 shown in FIG. 14 are performed first.

Namely, when an application is matched with an existing Application Template by the Application Template matching program 028A at step 2510 (i.e., sub-step 1430 of FIG. 14), all files accessed by the particular application are listed by referring to the AEHT 0284 in sub-step 1440. For each of the listed files, the corresponding matched application template ID is added to the extended attributes of the files. This list of files (file names and file path) accessed by the matched application is then forwarded to File-history Analysis program 028D in step 2520 of FIG. 25 and the Application Template Matching program 0287 initiates the File-history Analysis program 028D as explained below. The File-history Analysis program 028D then performs the process shown in FIG. 26.

Figure 26:
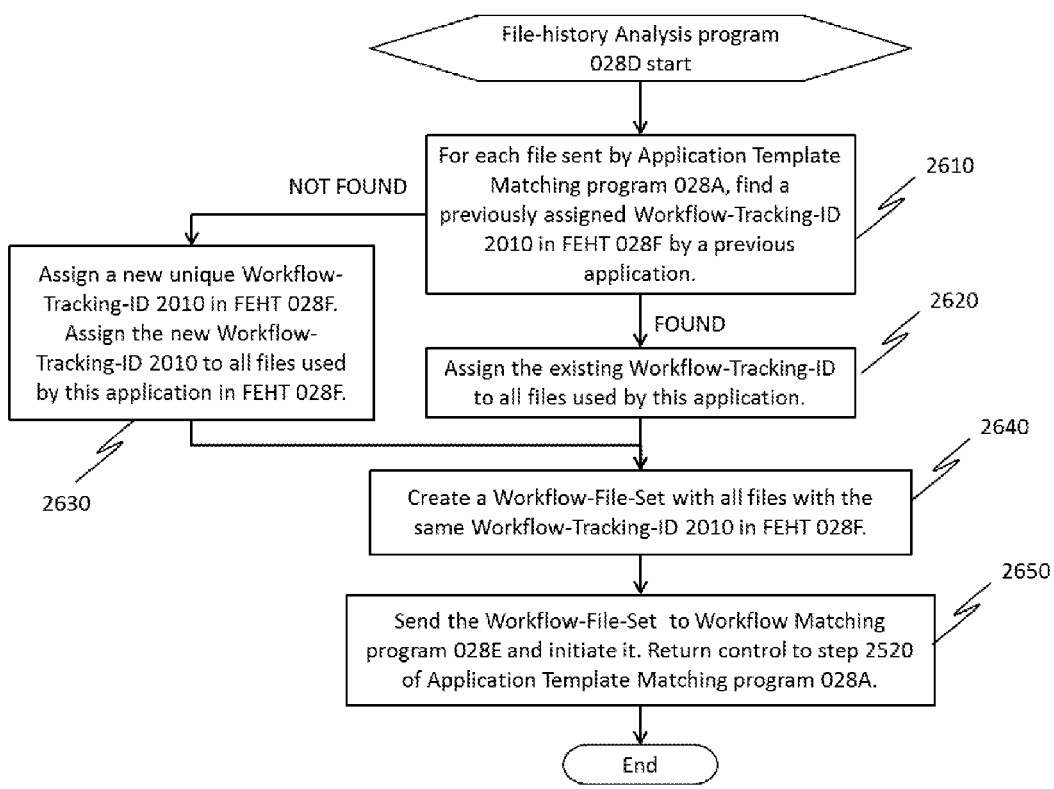
FIG. 26 is a flow diagram of a file-history analysis process according to the second embodiment of the present invention.

FIG. 26 is a flow diagram of a file-history analysis process according to the second embodiment of the present invention as performed by File-history Analysis program 028D. In step 2610, for each file sent by the Application Template Matching program 028A, the File-history Analysis program 028D performs a lookup by referring to the FEHT 028F to determine if any workflow-tracking-ID is assigned for each of the corresponding files. In step 2610, the processing is on a file-by-file basis using the pathname and extension, instead of on the file types in general (e.g., only the extension). If a matching Workflow-Tracking-ID 2010 is found, the process flow proceeds to step 2620. In step 2620, the existing, or current, Workflow-Tracking-ID 2010 is assigned to all files used by the respective application in the FEHT 028F which are sent from the Application Template Matching program 028A. Next, the processing flow proceeds to step 2640.

If a matching Workflow-Tracking-ID 2010 is not found in step 2610, the process flow proceeds to step 2630. In step 2630, for files that are accessed for the first time by any application, a workflow-tracking-ID may not exist. If none of the files accessed by this application have a previously assigned workflow-tracking-ID, then this indicates that this application is the first application in the given workflow. In other words, no other application has previously accessed any subset of files accessed by this application. Hence, a new, or current, workflow-tracking-ID is assigned and added in the FEHT 028F for each file sent from the Application Template matching program 028A. Thus, at step 2630, the File-history Analysis program 028D assigns a new unique Workflow-Tracking-ID 2010 in the FEHT 028F. Further, the new Workflow-Tracking-ID 2010 is assigned to all files used by the respective application in the FEHT 028F.

At step 2640, the File-history Analysis program 028D creates a Workflow-File-Set for all files having the same Workflow-Tracking-ID 2010 in the FEHT 028F. in other words, any files which are accessed and are associated with the same Workflow-Tracking ID 2010 are included in the created Workflow-File-Set In step 2650, the Workflow-File- Set to is sent to the Workflow Matching program 028E and the process flow of the Workflow Matching program 028E begins as described below in FIG. 27 in order to identify and match against other workflows. After processing returns from the Workflow Matching program 028E, in step 2650, processing returns back to step 2520 of the Application Template Matching program 028A.

Application Template Matching program 028A matches an ongoing application with one of the application templates and then proceeds to identify all the files accessed by the respective application. The File-history Analysis program 028D identifies an ongoing workflow. For example, the current application in question may be the first in the workflow, in which case a new workflow-tracking-ID is assigned, or the current application may be part of an existing, ongoing workflow, in which case, the existing workflow-tracking-ID is reused in the FEHT. Namely, a set a files (workflow-file-set) which consists of files (file name/path) accessed by all applications in the workflow are identified and correlated by access to at least one file shared with at least one other application.

Figure 27:
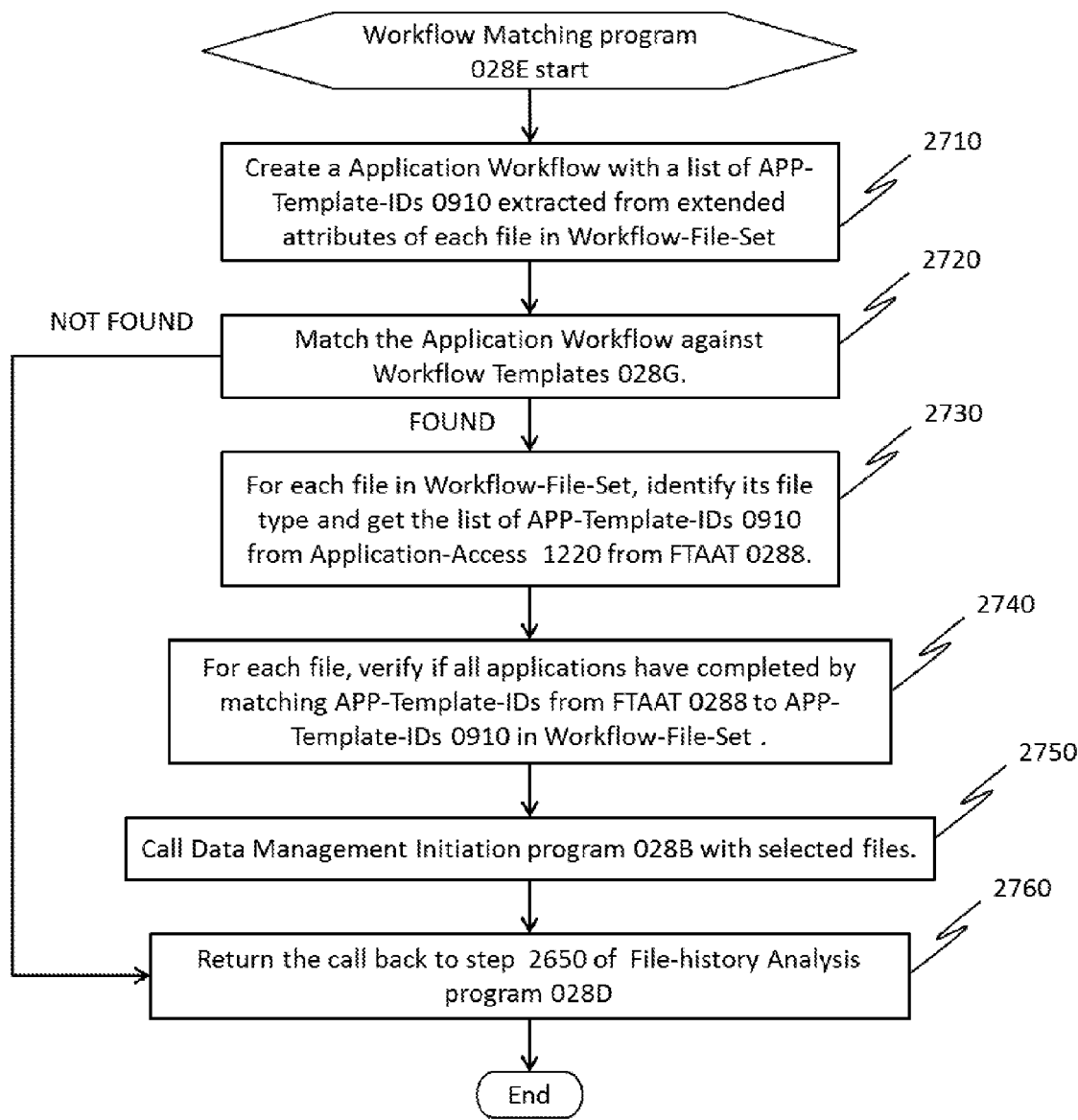
FIG. 27 is a flow diagram of a workflow matching process according to the second embodiment of the present invention.

FIG. 27 is a flow diagram of a workflow matching process according to the second embodiment of the present invention as performed by Workflow Matching program 028E. In step 2710, the program creates a temporary Application Workflow with a list of APP-Template-IDs 0910 extracted from extended attributes of each file in the Workflow-File-Set. The APP-Template-IDs 0910 are utilized to link the files in the Workflow-File-Set in the sequence that they are accessed. In step 2720, the Workflow Matching program 028E matches the temporary Application Workflow against the Workflow Templates 028G. If a matching Workflow Template 028G is not found, the program proceeds to step 2760. Otherwise, if a matching one of the Workflow Templates 028G is found, then at step 2730, for each file in the Workflow-File-Set, the Workflow Matching program 028E identifies its file type and gets the list of APP-Template-IDs 0910 from the Application-Access 1220 of the FTAAT 0288. Then at step 2740, for each file in the Workflow-File-Set, the Workflow Matching program 028E checks if all applications have completed by matching a list of APP-Template-IDs 0910 from the FTAAT 0288 to the APP-Template-IDs 0910 from the respective file's extended attributes. If they match, then the corresponding file has been verified that all expected applications have accessed the file and no other application is expected to access it in the future. Such files are then considered to be shortlisted for data management. For those files which still have pending applications that need to access thereto, the data management is not performed at this time. This indicates that the file may have been part of another workflow, for instance. Meanwhile, at step 2750, all files which are shortlisted, that is, files for which all expected applications have completed access thereto, are passed on to the Data Management Initiation program 028B.

It should be noted that the verification performed in steps 2730 and 2740 are not necessarily required despite being shown in FIG. 27. In other words, the flow shown in FIG. 27 can be omitted at steps 2730 and 2740 as a modification to the second embodiment.

Accordingly, the workflow matching program 028e will pass files for which all expected applications have completed accessing so that the processing shown in FIG. 17 can be performed similar to the first embodiment. As a result, a PFMT 0254 can be maintained similar to that shown in FIG. 16 so that files can undergo data management similar to the first embodiment. However, the advantage to the second embodiment is that files which may be accessed by multiple applications can be accounted for and data management thereof initiated only after the multiple applications have completed accessing such files. When the data management completes, the process flow proceeds to step 2760 and the process flow returns back to step 2650 of the File-history Analysis program 028D.

Third Embodiment

A third embodiment of the present invention will be illustrated and described with reference to FIGS. 28-30. The description of the third embodiment will mainly focus on the differences from the previous embodiments as follows. In the first and second embodiments, the Server 0110, as a standalone device, can provide complete file system services over the network 0100. In the third embodiment, a different configuration is provided in contrast with the previous embodiments. In the third embodiment, the Server 0110 is "split" into two and each role of the Server 0110 is performed by one of two different physical or logical devices. An example of such architecture is described in NFSv4.1 specification as Parallel NFS. However, the presently described embodiment is not intended to be limited in this respect.

Figure 28:
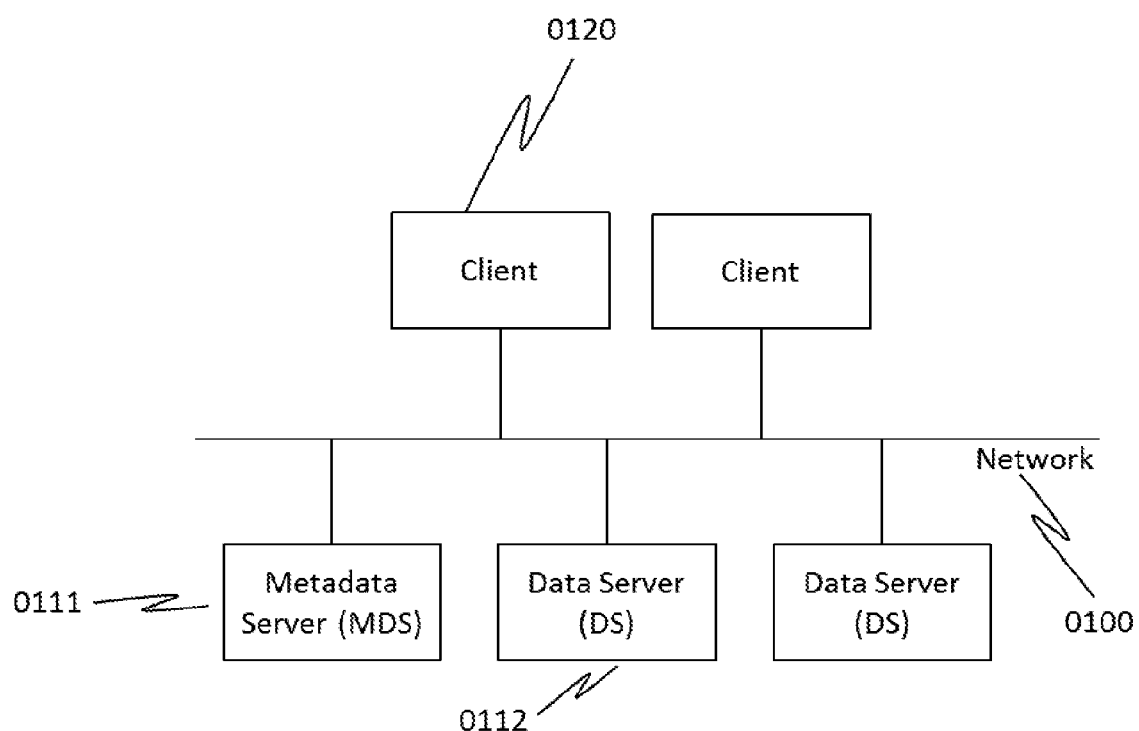
FIG. 28 illustrates an exemplary network configuration in which the methods and systems of the present invention may be applied according to a third embodiment of the present invention.

FIG. 28 illustrates an exemplary network configuration in which the methods and systems of the present invention may be applied according to a third embodiment of the present invention. As shown in FIG. 28, the system consists of a Metadata Server (MDS) 0111, a plurality of Data Servers (DSs) 0112, and a plurality of Clients 0120. The Clients 0120, MDS 0111 and DSs 0112 connected via the network 0100. Thus, in the third embodiment, the Server 0110 of the previous embodiment is split physically or logically into one or more MDSs 0111 and DSs 0112 so that read/write requests from the Clients 0120 are directed to the DSs 0112.

Figure 29:
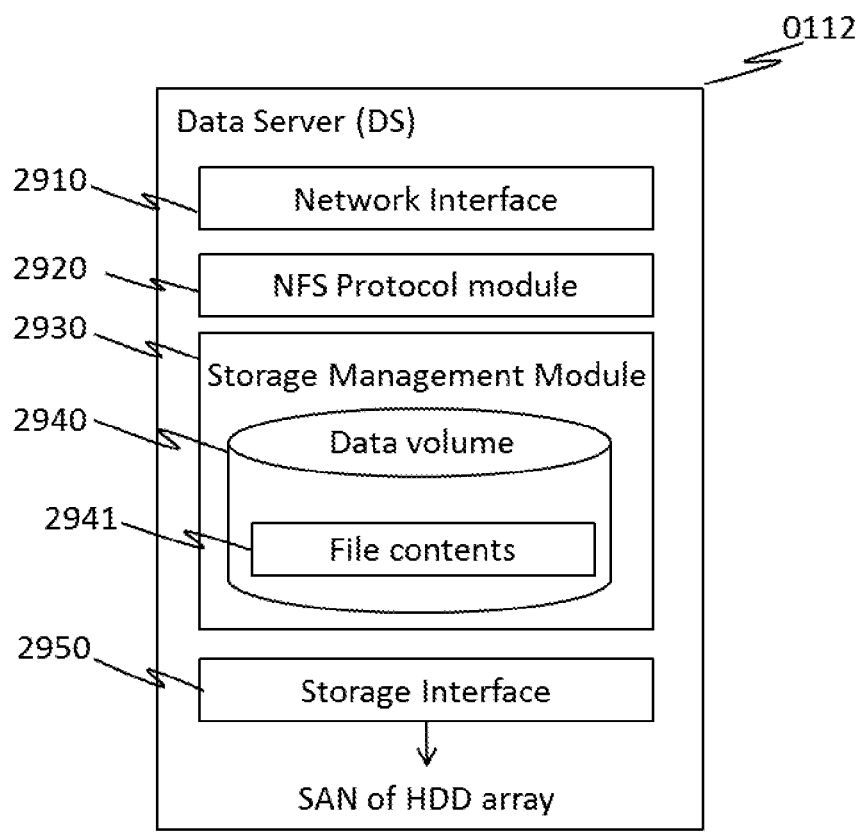
FIG. 29 is a block diagram of an exemplary data Server which provides storage management as shown in FIG. 28 according to the third embodiment of the present invention.

FIG. 29 is a block diagram of an exemplary DS 0112 which provides storage management as shown in FIG. 28 according to the third embodiment of the present invention. A DS 0112 may include, but is not limited to, a network interface 2910, an NFS protocol program 2920, a storage management program 2930, a data volume 2940, and a storage interface 2950 as components thereof. The network interface 2910 connects the DS 0112 to the network 0100 for communication with the MDS 0111 and the Clients 0120. For instance, the NFS protocol program 2920 is responsible for Server functionality of NFS protocol and serves operations from MDS 0111 and Clients 0120. The storage interface 2950 connects the storage management program 2930 to a storage device over a storage area network (SAN) or to an internal hard disk drive (HDD) for raw data storage. Thus, while FIG. 29 shows the DS 0112 connected to external storage via a SAN, the DS 0112 may also be modified to have internal storage instead or also a combination of both internal and external storage. For example, in FIG. 29, the storage management program 2930 organizes raw storage data onto a data volume 2940 which stores file contents (data) 2941. The DSs 0112 store file contents 2941 and provide service to read/write requests from Client 0120 and control protocol requests from MDS 0111.

Further, the MDS 0111 manages the namespace of the file system, stores metadata of the files and directories 0251 and the maps the files in the namespace to the file contents 2941 stored in the DSs 0112. The MDS 0111 processes metadata requests from Clients 0120 and sends control protocol requests to DSs 0112.

Thus, in the arrangement shown in FIG. 28, the Clients 0120 access the metadata of the files and directories 0251 by sending metadata requests to the MDS 0111 and access the file contents 2941 by sending read/write requests to DSs 0112.

In the third embodiment, all aspects of the present invention described in previous embodiments are implemented in MDS 0111 similar to the Server 0110 of first embodiment. The only difference is that the MDS 0111 does not receive read/write requests. Hence, read/write requests may not be taken into consideration in the Application Template 0286 creation and matching as described in the previous embodiments. However, when the Parallel NFS protocol is implemented in the third embodiment, the Client sends LAYOUT_GET and LAYOUT COMMIT requests to MDS 0111 as precursors to reads and writes. So, information in the LAYOUT_GET and LAYOUT_ COMMIT requests may be used in interpreting some of the read/write activity on the files of the DSs 0112. In any case, read/write requests are not mandatory according to the present invention and hence, but the absence of tracking read/write requests can adversely impact the accuracy of data management as presented herein.

In FIG. 28, the MDS 0111, the DS 0112, and the Client 0120 can also be equipped with a block-access protocol program, such as iSCSI (Internet Small Computer System Interface) and FCOE (Fibre Channel over Ethernet). The MDS 0111 can store location information of file contents in such a way that a Client 0120 can access file contents via either NFS protocol program or the block-access protocol program.

Figure 30:
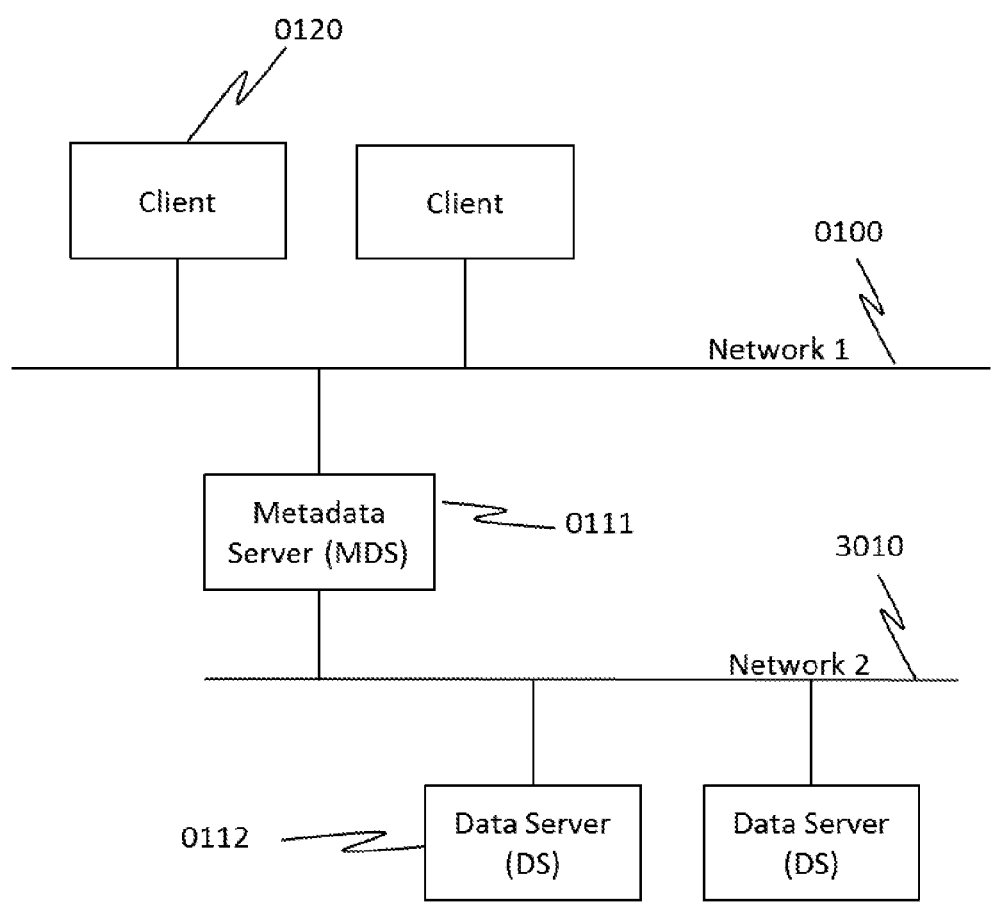
FIG. 30 illustrates an exemplary network configuration in which the methods and systems of the present invention may be applied according to a modification of the third embodiment of the present invention.

FIG. 30 illustrates an exemplary network configuration in which the methods and systems of the present invention may be applied according to a modification of the third embodiment of the present invention. FIG. 30 shows a variation in the configuration described in FIG. 28. As described above, although the role of Server 0110 is split into the MDS 0111 and DSs 0112, a primitive Client 0120 may not be aware of this architecture. In order to provide improved compatibility to different NFS Client implementations, in the modification to the third embodiment the MDS 0111 does support read/write requests from the Clients 0120.

The arrangement shown in FIG. 30 consists of a Metadata Server (MDS) 0111, a plurality of Data Servers (DSs) 0112, and a plurality of Clients 0120. The Clients 0120 and MDS 0111 are connected to a network 1 0100. MDS 0111 and DSs 0112 are connected to a network 2 3010. The Clients 0120, access both metadata of the files and directories 0251 and file contents 2941 by sending metadata and read/write requests to MDS 0111 through network 1 0100. In turn, the MDSs 0111 serves metadata requests and read/write requests from Clients 0120. For metadata requests, the functionality of MDS 0111 is exactly the same as in FIG. 28. However, for read/write requests, the MDS 0111 communicates with the DSs 0112 over network 2 3010 to read and write file contents 2941 which are stored and managed by the respective DSs 0112. Accordingly, in this modification all aspects of the present invention described in the first and second embodiments are implemented in the MDS 0111 similar to the Server 0110. As a result all file system requests are served by one logical entity, the MDS 0111, and fully automated, proactive and fine-grained, application aware data management can be realized.

Of course, the system configurations illustrated in the Drawings are purely exemplary of systems in which the present invention may be implemented, and the invention is not limited to a particular hardware or logical configuration.

It should be further understood by those skilled in the art that although the foregoing description has been made with respect to particular embodiments of the invention, the invention is not limited thereto and various changes and modifications may be made without departing from the spirit of the invention and the scope of the appended claims. The computers and storage systems implementing the invention can also have known I/O devices (e.g., CD and DVD drives, floppy disk drives, hard drives, etc.) which can store and read the modules, programs and data structures used to implement the above-described invention. These modules, programs and data structures can be encoded on computer-readable media. For example, the data structures of the invention can be stored on computer-readable media independently of one or more computer-readable media on which reside programs to carry out the processing flows described herein. The components of the system can be interconnected by any form or medium of digital data communication network. Examples of communication networks include local area networks, wide area networks, e.g., the Internet, wireless networks, storage area networks, and the like.

In the description, numerous details are set forth for purposes of explanation in order to provide a thorough understanding of the present invention. However, it will be apparent to one skilled in the art that not all of these specific details are required in order to practice the present invention. It is also noted that the invention may be described as a process, which is usually depicted as a flowchart, a flow diagram, a structure diagram, or a block diagram. Although a flowchart may describe the operations as a sequential process, many of the operations can be performed in parallel or concurrently. In addition, the order of the operations may be re-arranged.

As is known in the art, the operations described above can be performed by hardware, software, or some combination of software and hardware. Various aspects of embodiments of the invention may be implemented using circuits and logic devices (hardware), while other aspects may be implemented using instructions stored on a machine-readable medium (software), which if executed by a processor, would cause the processor to perform a method to carry out embodiments of the invention. Furthermore, some embodiments of the invention may be performed solely in hardware, whereas other embodiments may be performed solely in software. Moreover, the various functions described can be performed in a single unit, or can be spread across a number of components in any number of ways. When performed by software, the methods may be executed by a processor, such as that of the Server 0110, based on instructions stored on a computer-readable medium, such as the System Memory 0280. If desired, the instructions can be stored on the medium in a compressed and/or encrypted format.

From the foregoing, it will be apparent that the invention provides methods, apparatuses, systems and programs stored on computer readable media for improving the accuracy and reducing the calculation cost of a root cause analysis. Additionally, while specific embodiments have been illustrated and described in this specification, those of ordinary skill in the art appreciate that any arrangement that is calculated to achieve the same purpose may be substituted for the specific embodiments disclosed. This disclosure is intended to cover any and all adaptations or variations of the present invention, and it is to be understood that the terms used in the following claims should not be construed to limit the invention to the specific embodiments disclosed in the specification. Rather, the scope of the invention is to be determined entirely by the following claims, which are to be construed in accordance with the established doctrines of claim interpretation, along with the full range of equivalents to which such claims are entitled.

What is claimed is:

1. A data management server which communicates with one or more applications, comprising:
   a processor; and
   a memory storing:
   a plurality of files accessed by the one or more applications;
   a plurality of previously generated first application templates each having an application template identifier and each indicating a plurality of events performed by one application, of the one or more applications, on one or more of the files, and indicating, in association with each event, a file type, of a plurality of file types, of respective files on which an event was performed by the one application;
   one or more management actions in association with each of the plurality of file types, wherein a management action of the one or more management action is one of migrating data of the respective file, archiving data of the respective file, and deleting data of the respective file; and
   instructions that when executed by the processor, cause the processor to:
   monitor a plurality of events performed by the one or more applications on one or more of the plurality of files within a first time period;
   store the plurality of events performed by the one or more applications within the first time period in association with an application identifier identifying the application of the one or more applications performing the event;
   generate a second application template having an application identifier that indicates, one or more events performed by one application, of the one or more applications, within the first time period and that indicates, in association with each event performed within the first time period, a file type of respective files on which an event was performed by the one application based on the stored plurality of events stored in association with the respective time of the events and respective application identifiers of the application performing the events;
   determine and store in association with each file type, for each of the plurality of file types, one or more application templates that perform an event on a file having a respective file type of the plurality of files types based on the first application template and the second application template;
   upon determining the second application template matches one or more of the plurality of first application templates, for each file having an event performed thereon by the one application of the second application template, identify one or more management actions for each file based on the stored one or more management actions in association with each of the plurality of file types of each of the files, and execute each of the management actions for each file.

2. The data management server according to claim 1, wherein the stored one or more management actions in association with each of the plurality of file types includes information indicating a timing of executing each management action that is associated with each file type, and
   wherein the management actions executed for each file are executed in accordance with the information indicating the timing of execution.

3. The data management server according to claim 1, further comprising:
   a storage volume containing metadata of the plurality of files, and
   wherein the server is connected to a storage area network which stores data of each of the files.

4. The data management server according to claim 3, further comprising:
   a storage volume containing metadata of the files; and
   a storage device containing the data of the files.

5. The data management server according to claim 1, wherein the processor is further programmed to:
   generate a set of one or more second application templates from the events performed within the first period of time,
   correlate file types of one or more of the files with applications from the set of second application templates, and
   generate a workflow from the set of application templates according to the correlation of the file types thereof.

6. The data management server according to claim 5, wherein the processor is further programmed to:
   generate a new application template from the events;
   determine whether the new application template matches with the set of generated application templates; and
   when the new application template matches with the set of generated application templates:
     create a workflow file set, for each file associated with the new application template,
     determine whether the workflow file set matches with the workflow from the set of application templates, and
     when the workflow file set matches with the workflow from the set of application templates:
       verify that all applications of the workflow file set have completed, and
       determine at least one data management action for each file associated with the workflow file set.

7. The data management server according to claim 6, the processor is further programmed to:
   execute the at least one data management action for each file associated with the workflow file set.

8. The data management server according to claim 5, wherein when the new application template does not match with the set of generated application templates:
   the processor determines that the files of the new application template are associated with a new workflow.

9. The server according to claim 5, further comprising:
   a metadata server including a storage volume containing metadata of the files; and
   one or more data servers connected to the metadata server, each of the data servers including a data volume storing data of one or more of the files,
   wherein the metadata server and the one or more data servers are connected over a network, and
   wherein the events from the one or more applications are received by the metadata server over the network.

10. The server according to claim 5, further comprising:
    a metadata server including a storage volume containing metadata of the files; and
    one or more data servers connected to the metadata server, each of the data servers including a data volume storing data of one or more of the files, wherein the events from the one or more applications are received by the metadata server over a first network, and wherein the metadata server and the one or more data servers are connected over a network.

11. The data management server according to claim 1, further comprising:

a metadata server including a storage volume containing metadata of the files; and one or more data servers connected to the metadata server, each of the data servers including a data volume storing data of one or more of the files, wherein the metadata server and the one or more data servers are connected over a network, and wherein the events from the one or more applications are received by the metadata server over the network.

12. The data management server according to claim 1, further comprising:

a metadata server including a storage volume containing metadata of the files; and one or more data servers connected to the metadata server, each of the data servers including a data volume storing data of one or more of the files, wherein the events from the one or more applications are received by the metadata server over a first network, and wherein the metadata server and the one or more data servers are connected over a network.

13. The data management server according to claim 1, wherein the stored plurality of events performed by the one or more applications within the first time period are associated with time information indicating a time when the event was performed, and wherein the first application template and the second application template each indicate the respective plurality of events in chronological order based on the stored respective times each event was performed.

14. The data management server according to claim 1, wherein an event is one of create a file, open a file, remove a file, write a file, and read a file.

* * * * *